Patented July 24, 1951

2,561,814

UNITED STATES PATENT OFFICE 2,561,814

POTENTIALLY REACTIVE CURABLE POLYMERS

Emil E. Novotny, Prospectville, George Karl Vogelsang, La Mott, and Ernest E. Novotny, Philadelphia, Pa., assignors, by mesne assignments, to The Borden Company, New York, N. Y., a corporation of New Jersey No Drawing. Application November 21, 1944, Serial No. 564,554

16 Claims. (Cl. 260—2)

The present invention relates to potentially reactive compositions which possess the faculty of being partially or completely convertible to the infusible, infusible thermo-rigid, or vulcanized rubbery state. More specifically stated, the present invention is drawn to potentially reactive curable compositions which are made by mixing a compound selected from the class comprising the saturated halogenation products of the aldehydes of the mono hetero atomic five membered rings and their reactive derivatives, with a polymeric organic compound containing a plurality of atomic groups reactive with compounds selected from the class comprising the saturated halogenation products of the aldehydes of the mono hetero atomic five membered rings and their reactive derivatives, said reactive atomic groups being present in the proportion of at least one such group per thousand atoms of the aforesaid polymeric organic compound.

The prime object of the present invention is the production of potentially reactive curable compositions that can be converted to an infusible, infusible thermo-rigid, or vulcanized rubbery state.

A further object is to provide means whereby nominally thermoplastic compositions can be converted into potentially reactive curable compositions which, when cured, are possessed of a higher than usual degree of heat insensitiveness.

A further object is to provide means whereby nominally thermoplastic compositions can be converted into potentially reactive curable compositions which, when cured, are possessed of a higher than usual degree of solvent resistance.

A further object is the production of a new class of potentially reactive curable compositions that is preeminently adapted for the manufacture of resinous, plastic, and rubbery compositions suitable for use in press, injection, extrusion, transfer, and cold molding operations.

A further object is the production of a new class of potentially reactive curable compositions that is preeminently adapted for use in the manufacture of abrasives, adhesives, bonding agents, casting compositions, cements, coating compositions, enamels, frictional elements, impregnants, insulation, leather substitutes, paints and varnishes, plywood, proofing compositions, stiffening agents, varnishes, etc.

A further object is the production of potentially reactive compositions that can be cured to yield rubbery vulcanizates of superior and outstanding properties.

In its essence the potentially reactive curable compositions of the present invention are prepared by mixing together a "curing agent" with a "co-agent." The "curing agent" is essentially a compound selected from the class comprising the saturated halogenation products of the aldehydes of the mono hetero atomic five membered rings and their reactive derivatives. These "curing agents" are unusually reactive compounds, reacting as they do with an exceedingly wide variety of functionally "reactive atomic groups." The presence of such "reactive atomic groups" in a polymeric organic compound inexorably imparts to the compound the faculty of being able to enter into a curing reaction with the aforedescribed class of "curing agents." A wide variety of naturally occurring polymeric organic compounds contain the requisite reactive atomic groups and, as such, are suitable for use in the present invention. An almost endless variety of polymeric organic compounds may be synthesized so as to contain the requisite "reactive atomic groups" so as to suit them for use as "co-agents."

Through the teachings of the present invention it becomes possible to advantageously prepare a virtually limitless number of potentially reactive curable compositions without recourse to any of the usual curing or vulcanizing agents. Unique and distinctive curable compositions may be made from a wide variety of polymeric compounds which are ordinarily regarded as non-curable by rendering such compounds susceptible to cure after the manner disclosed in copending application (Serial No. 495,036 filed July 16, 1943 and now abandoned), and as also indicated further on in the present specifications, and then admixing the same with a material selected from the class consisting of the saturated halogenation products of the aldehydes of the mono hetero atomic five membered rings and their reactive derivatives as curing agent.

In brief the present invention discloses means whereby the majority of the known curable polymeric materials can be cured via the helogenation products of the aldehydes of the mono hetero atomic five membered rings and their reactive derivatives as curing agents and also discloses how curable compositions can be made out of polymeric materials that have heretofore been considered as not readily lending themselves to the production of such curable compositions by known means.

Inasmuch as the present invention necessarily depends upon the use of the saturated halogenation products of the aldehydes of the mono hetero atomic five membered rings and their reactive derivatives as curing agents and upon the use of polymers which contain certain essential potentially reactive atomic groups, it is desirable in the interest of clarity to define these inter-reactable components.

The saturated halogenation products of the aldehydes of the mono hetero atomic five membered rings may be produced by the methods described in copending application, Serial No. 464,524, filed November 4, 1942, now Patent No. 2,490,462, patented December 6, 1949. The reactive derivatives of the said halogenated aldehydes are in part described in the afore-alluded to application but are more fully described in copending application, Serial No. 466,480, filed November 21, 1942, now Patent No. 2,475,801, patented July 12, 1949. For the sake of completeness, we give below a brief description of the synthesis of these unique "curing agents."

The saturated halogenation products of the aldehydes of the mono hetero atomic five membered rings may be produced through the method which comprises the steps of diluting a mole of one or more of the said aldehydes with at least a mole of solvent and then rapidly introduce halogen in the proportion of substantially four atoms of halogen per molecule of the said aldehyde while maintaining the temperature below the point of spontaneous decomposition. The reactive derivatives of the halogenated heterocyclic aldehydes may be produced through the method which comprises partially dehalogenating the saturated halogenation products of the aldehydes of the mono hetero atomic five membered rings, the said dehalogenation to involve an average removal of less than ¾ of the original halide content of the halogenated aldehydes.

From the standpoint of ease of production and general reactivity the fully saturated chlorination product of furfural is perhaps of the greatest interest in connection with the present invention although we wish to emphasize that all of the saturated halogenation products of the aldehydes of the mono hetero atomic five membered rings and their reactive derivatives are useful for the purpose of curing up the products of the present invention. The following is an illustrative example of the manner in which the saturated chlorination product of furfural may be produced.

Fifteen parts of dry, pure furfural are dissolved in fifty parts of carbon tetrachloride in a glass-lined chlorinator provided with a suitable stirrer and cooling facilities. Chlorine is passed into the mixture at as rapid a rate as it consistent with the cooling facilities and the attainment of a good absorption efficiency. The solution should be permitted to absorb approximately 22.2 parts of chlorine. The temperature is best kept from rising above 100° F. and is preferably kept below 80° F. The resultant solution of fully chlorinated furfural is very stable and such a solution, on standing for a period of a year, shows no appreciable change. Such mixtures may also be refluxed for considerable periods of time without undergoing any discernible change. The mixture may be concentrated under vacuum so as to remove the diluent. Towards the end of this operation the vacuum may advantageously be increased and the temperature may be raised to in the neighborhood of 125° C. to assure a thorough removal of the volatiles.

More specific details for the carrying out of the above process as well as the halogenation of heterocyclic aldehydes other than furfural and the use of halogens other than chlorine may be procured from the copending application, Serial No. 464,524, now Patent No. 2,490,462, already referred to.

The reactive derivatives of the saturated halogenation products of the aldehydes of the mono hetero atomic five membered rings are of particular interest in connection with the present invention and may be produced by subjecting the said halogenated aldehydes to the action of heat either per se or in the presence of any one of innumerable reagents. When the aforesaid halogenated aldehydes are subjected to the action of heat either per se or in the presence of substantially inert solvents, there may be produced derivatives which are chemically even more reactive than the progenitors themselves. When the saturated aldehydes are reacted with other reactants an almost unlimited variety of products may be produced. Such reaction products function as "curing agents" provided that they contain more than 25% of the original halogen atoms contained in the halogenated aldehyde. The reactive derivatives of the saturated halogenation products of the aldehydes of the mono hetero atomic five membered rings may be referred to as the products of partial dehalogenation. It appears to be immaterial as to how the partial de-halogenation is achieved—seemingly all the reaction products, provided that they retain at least 25% of the original halogen content, function as "curing agents."

Representative of suitable co-reagents for the production of reactive derivatives out of the saturated halogenation products of the aldehydes of the mono hetero atomic five membered rings are: water; ammonia and all manner of ammonia derivatives; alkali metals, oxides and hydroxides; alkaline earth metals, oxides and hydroxides; heavy metals, as well as their oxides and hydroxides in the active state; carbonates, sulphides, sulphites, borates, the salts of weak inorganic acids, as well as the salts of virtually all organic acids; and organic compounds of all sorts, virtually without qualification.

In producing the reactive derivatives the only requisite is that the reaction conditions as regards pressure, temperature, time, etc., as well as the chemical co-reagents, if any, be such that the de-halogenation shall not be carried beyond the point where more than 75 per cent of the halogenated aldehyde's original halogen content is removed. When more than three-quarters of the original halogen content is removed in the process of de-halogenation, then the resultant reaction products may be characterized as falling outside of the scope of reactivity where they satisfactorily function as "curing agents."

Of the known aldehydes of the mono hetero atomic five membered rings furfural is by far the most abundant and, indeed, because of its agricultural origin, may be said to be inexhaustible. For this reason the present inventors, in the majority of the ensuing illustrative examples, list as the preferred curing agent the saturated halogenation product of furfural and the reactive derivatives thereof. It should be clearly understood, however, that the saturated halogenation products of the aldehydes of the mono hetero atomic five membered rings other than furfural are usable.

Chlorine is by far the most abundant, most available, and most widely distributed halogen element in the earth's crust. For this reason, in most of the ensuing examples, the present inventors have, for purposes of illustration, listed the saturated chlorination product of furfural and the reactive derivatives thereof as the preferred curing agents. It is to be distinctly understood, however, that the halogenation products of the halogens other than chlorine, that is fluorine, bromine, and iodine, are also usable in the present invention as are also the mixed halogenation products.

The following examples illustrates the production of reactive derivatives from chlorinated furfural.

Chlorinated furfural, 47.6 parts, is heated to a temperature of approximately 370° F. under a pressure of from 100 to 300 mm. of Hg. The rate of heating may be so regulated that the processing is completed in approximately two to three hours, and the final weight of residuum should be between 41 and 42 parts. The above product is decidedly more fluid than the original chlorinated furfural and is possessed of a chlorine content of 55.07 per cent.

A mixture comprising 47.6 parts of chlorinated furfural and 47.6 parts of xylene is refluxed for a period of five hours. The mixture is then partially distilled, first under a pressure of from 100 to 300 mm. of Hg, and then under a pressure of less than 20 mm. of Hg. The temperature may advantageously be kept at 325° F. and the heat is maintained until the rate of distillation appreciably slows up and the weight of residuum falls within the range of approximately 35 to 38 parts. This de-halogenated reactive derivative contained 53.5 per cent of chlorine, possessed an acid number of 126, a saponification number of 173, a mean molecular weight of approximately 450, and a specific gravity of 1.619.

A mixture comprising 52.5 parts of chlorinated furfural and 96.0 parts of methanol is refluxed for a period of about ten hours when a loss in weight of approximately 18.0 parts will occur. The loss in weight is almost exclusively due to evolved methyl chloride. The mixture is then subjected to partial distillation, first under a pressure of from 100 to 300 mm. of Hg and then under a pressure of less than 20 mm. of Hg, when a yield of approximately 45.5 parts of a partially de-halogenated reactive derivative results. This product analyzed carbon 36.67 per cent, hydrogen 3.99 per cent, chlorine 31.22 per cent, oxygen 28.1 per cent, acid number 21.05, saponification number 744, specific gravity 1.414 and methoxy group content 21.45 per cent.

A mixture comprising 47.56 parts of chlorinated furfural and 8.02 parts of methanol is refluxed until an initial loss in weight of approximately 5.1 parts occurs. The mixture is then subjected to partial distillation, first under a pressure of from 100 to 300 mm. of Hg and finally under a pressure of less than 20 mm. of Hg to yield approximately 41.8 parts of a partially dehalogenated reactive derivative containing 43.0 per cent of chlorine and 12.06 per cent of methoxy.

A mixture comprising 47.56 parts of chlorinated furfural, 64.08 parts of methanol, and 1.8 parts of water is refluxed until an initial loss in weight of approximately 5.1 parts occurs. The mixture is then subjected to partial distillation, first under a pressure of from 100 to 300 mm. of Hg and finally under a pressure of less than 20 mm. of Hg to yield 41.6 parts of a partially de-halogenated reactive derivative containing 37.07 per cent of chlorine and 16.01 per cent of methoxy.

Calcium carbonate, 5.0 parts, is slowly added to a solution comprising 47.6 parts of chlorinated furfural dissolved in 70.0 parts of methanol. The mixture is then heated and kept hot for a short period of time and is then concentrated under a pressure of from 100 to 300 mm. of Hg to a weight of approximately 70.5 parts. The further processing is optional, but the following gives good results: To the concentrate add 60.0 parts of benzene, and 32.0 parts of water. Shake, separate the layers, dry the benzene layer, filter and, if desired, clarify with decolorizing carbon. The benzene solution is then subjected to partial distillation, first under a pressure of from 100 to 300 mm. of Hg and then under a pressure of less than 20 mm. of Hg to yield approximately 40.9 parts of an amber colored partially de-halogenated reactive derivative containing 40.47 per cent of chlorine and 16.44 per cent of methoxy.

Zinc dust, 3.27 parts, was slowly added to a mixture consisting of 47.6 parts of chlorinated furfural and 32.08 parts of methanol. The mixture was cooled down to prevent excessive loss through volatization. The mixture was subjected to partial distillation under a pressure of from 100 to 300 mm. of Hg and finally under a pressure of less than 20 mm. of Hg to yield 31.1 parts of a partially de-halogenated reactive derivative which contained 24.5 per cent of chlorine and 4.28 per cent of methoxy. The above weight and percentage data includes the zinc chloride synthetically formed.

Zinc chloride, 0.68 part, was added to a mixture consisting of 47.6 parts of chlorinated furfural and 16.04 parts of methanol. The mixture was subjected to partial distillation, first under a pressure of between 100 and 300 mm. of Hg and then under a pressure of less than 20 mm. of Hg to yield 30.8 parts of a partially de-halogenated reactive derivative which contained 30.4 per cent of chlorine and 7.86 per cent of methoxy. The product of this reaction was a grindably hard mass.

A solution comprising 4.1 parts of anhydrous sodium acetate dissolved in 32.08 parts of methanol was added to 47.6 parts of chlorinated furfural. The mixture was then subjected to partial distillation, first under a pressure of between 100 and 300 mm. of Hg and then under a pressure of less than 20 mm. of Hg to yield 45.7 parts of a residuum which contained some NaCl. Sixty parts of benzene and 36.0 parts of water were added to the above residuum and after agitation, the stratified layers were separated. The benzene layer was then dried, de-colorized, and filtered and the benzene was then distilled off under reduced pressure to yield 39.0 parts of a partially de-halogenated reactive derivative which contained 44.6 per cent of chlorine and 8.66 per cent of methoxy besides some acetal groups.

A solution comprising 11.2 parts of potassium hydroxide dissolved in 60.0 parts of methanol was slowly added to a mixture consisting of 47.6 parts of chlorinated furfural dissolved in 20.0 parts of methanol. The mixture was subjected to partial distillation, first under a pressure of between 100 and 300 mm. of Hg and then under a pressure of less than 20 mm. of Hg. Sixty parts of benzene and 36.0 parts of water were then added to the residuum and the resultant mixture after shaking, was permitted to stratify and the benzene layer was removed, dried, de-colorized, and finally freed from the benzene by vacuum concentration. Approximately 36.0 parts of a partially de-chlorinated reactive derivative were procured.

Chlorinated furfural, 14.3 parts, was dissolved in 49.0 parts of normal butanol and the resultant mixture was then subjected to slow distillation, first under a pressure of between 100 and 300 mm. of Hg and finally under a pressure of less than 20 mm. of Hg to yield 12.4 parts of a reactive derivative which analyzed 51.0 per cent carbon, 7.07 per cent hydrogen, 16.1 per cent chlorine, and 25.85 per cent oxygen.

A mixture comprising 10.9 parts of chlorinated furfural and 46.0 parts of iso-butanol was subjected, first to slow fractional distillation at atmospheric pressure and then to partial distillation first under a pressure of 100 to 300 mm. of Hg and finally under a pressure of less than 20 mm. of Hg to yield 11.16 parts of a reactive derivative which analyzed carbon 55.45 per cent, hydrogen 7.62 per cent and chlorine 13.91 per cent.

A mixture comprising 14.07 parts of chlorinated furfural and 59.25 parts of a secondary butyl alcohol was subjected first to slow fractional distillation at atmospheric pressure and then to direct partial distillation, first under a pressure of between 100 and 300 mm. of Hg and finally under a pressure of less than 20 mm. of Hg to yield 11.11 parts of a reactive derivative which analyzed 52.5 per cent carbon, 6.1 per cent hydrogen, and 17.2 per cent chlorine.

A mixture comprising 4.76 parts of chlorinated furfural and 5.92 parts of tertiary butyl alcohol was subjected to slow fractional distillation at atmospheric pressure. Very considerable quantities of gas were evolved. The mixture was then subjected to direct distillation at atmospheric pressure and finally under a pressure of less than 20 mm. of Hg to obtain 9.09 parts of derivative. Tertiary alcohols of all sorts are more or less completely decomposed by the saturated halogenation products of the aldehydes of the mono hetero atomic five membered rings.

A mixture comprising 47.6 parts of chlorinated furfural and 27.6 parts of secondary amyl alcohol without any preliminary refluxing is immediately subjected to partial distillation, first under a pressure of between 100 and 300 mm. of Hg and then under a pressure of less than 20 mm. of Hg to yield 41.27 parts of a partially de-halogenated reactive derivative which contained 40.85 per cent of chlorine.

A mixture comprising 47.6 parts of chlorinated furfural and 38.03 parts of the mono methyl ether of ethylene glycol was directly subjected to partial distillation under a pressure of less than 20 mm. of Hg to yield 43.52 parts of a partially de-halogenated reactive derivative which contained 37.22 per cent of chlorine and had an alkoxy content equivalent to 7.48 per cent calculated as methoxy.

A mixture comprising 47.6 parts of chlorinated furfural and 58.05 parts of butyl acetate was first refluxed four hours and then subjected to partial distillation, first under a pressure of between 100 and 300 mm. of Hg and finally under a pressure of less than 20 mm. of Hg to yield 44.2 parts of a reactive derivative which contained 47.8 per cent of chlorine.

A mixture comprising 47.6 parts of chlorinated furfural and 31.02 parts of ethylene glycol was directly subjected to partial distillation under a pressure of less than 20 mm. of Hg to yield 44.1 parts of a partially de-halogenated derivative which contained 31.33 per cent of chlorine.

A mixture comprising 47.6 parts of chlorinated furfural and 40.0 parts of ethylene chlorhydrin is directly subjected to partial distillation under a pressure of less than 20 mm. of Hg to yield 44.4 parts of a reactive derivative which contained 50.05 per cent of chlorine.

A mixture comprising 47.6 parts of chlorinated furfural and 29.0 parts of acetone (dimethyl ketone) was refluxed four hours and then subjected to partial distillation, first under a pressure of from 100 to 300 mm. of Hg and finally under a pressure of less than 20 mm. of Hg to yield 41.3 parts of a reactive derivative containing 51.2 per cent of chlorine.

A mixture comprising 47.6 parts of chlorinated furfural and 36.05 parts of ethyl methyl ketone was refluxed for two hours and then subjected to partial distillation, first under a pressure of from 100 to 300 mm. of Hg and then under a pressure of less than 20 mm. of Hg to yield 41.0 parts of a partially de-chlorinated reactive derivative containing 51.9 per cent of chlorine.

A mixture comprising 47.6 parts of chlorinated furfural and 56.06 parts of di-isobutylene was first refluxed for a period of four hours and then subjected to partial distillation, first under a pressure of from 100 to 300 mm. of Hg and finally under a pressure of less than 20 mm. of Hg to yield 39.7 parts of a reactive derivative containing 38.6 per cent of chlorine.

A mixture comprising 47.6 parts of chlorinated furfural, 32.0 parts of butanol, and 0.68 part of anhydrous zinc chloride was refluxed for four hours and then subjected to partial distillation, first under a pressure of between 100 and 300 mm. of Hg and then under a pressure of less than 20 mm. of Hg to yield 23.89 parts of a grindably hard reactive derivative containing 14.91 per cent of chlorine.

A mixture comprising 24.0 parts of chlorinated furfural, 36.0 parts of mono methyl ether of ethylene glycol and 2.0 parts of distilled water was refluxed for eight hours and then subjected to distillation, first at atmospheric pressure, then under a pressure of between 100 and 300 mm. of Hg and then under a pressure of less than 20 mm. of Hg, ending up with a kettle jacket temperature of approximately 425° F. and continuing the reaction until the product acquired a rubbery character. A yield of approximately 11.0 parts of a black rubbery product was procured. The material analyzed chlorine 5.3 per cent, hydrogen 5.6 per cent, and carbon 52.2 per cent. This particular derivative was still perspectively reactive. Had the heating and distillation been stopped earlier a more fluid and more reactive product would have been procured and vice versa, had the heating and vacuum distillation been continued beyond the point to which it was carried, then substantially infusible, rubbery, and hard products are obtained which test substantially non-reactive. When chlorinated furfural or its equivalent is reacted with the mono methyl or mono ethyl ether of ethylene glycol a very large quantity of alkyl halide is generated.

A mixture comprising 2.38 parts of chlorinated furfural and 3.6 parts of butyl aldehyde is refluxed for four hours and then subjected to partial distillation first at atmospheric pressure and then under a pressure of less than 20 mm. of Hg until at a temperature of 300° F. nothing further distills off. A yield of 3.36 parts is procured which analyzed 70.7 per cent of carbon, 8.38 per cent of hydrogen, and 7.56 per cent of chlorine.

A mixture comprising 2.38 parts of chlorinated furfural, 4.64 parts of the methyl ester of alpha-methoxy isobutyric acid was refluxed for three hours and then subjected to partial distillation under a pressure of less than 20 mm. of Hg at a temperature of 340° F. to yield 1.26 parts of a reactive product.

Anhydrous aluminum chloride, 2.67 parts, is cautiously added to a mixture comprising 4.2 parts of chlorinated furfural and 4.7 parts of benzene. The mixture was then refluxed upon a water bath for about two hours and then 20.0 parts of water and 8.0 parts of benzene were added along with a little hydrochloric acid and the mixture was refluxed for thirty minutes. The mixture was then permitted to cool, the layers separated, and the benzene solution was decolorized, filtered, and then concentrated by evaporation at a temperature of 212° F. at a pressure of less than 20 mm. of Hg. A more or less reactive hard product weighing 5.67 parts was procured.

Anhydrous aluminum chloride, 2.67 parts, was added to a mixture consisting of 4.2 parts of chlorinated furfural and 20.23 parts of di-isobutylene. After the aluminum chloride had been added the mixture was permitted to cool somewhat and 1.0 part of hydrochloric acid along with 20.0 parts of water were added. The mixture was refluxed thirty minutes. After cooling the layers were separated. The organic layer was filtered and the benzene and excess di-isobutylene, etc., were distilled off, yielding 7.61 parts as the derivative.

A mixture comprising 4.5 parts of chlorinated furfural and 3.1 parts of α-terpineol was heated upon a water bath for one hour. The temperature was then raised to 300° F. under a pressure of between 100 and 300 mm. of Hg and then to 350° F. under the same pressure until a grindably hard product weighing 4.29 parts was procured.

A mixture comprising 4.0 parts of chlorinated furfural, 12.0 parts of diethylene glycol and 3.53 parts of water was refluxed for a period of several hours and then subjected to partial distillation, first under a pressure of 100 to 300 mm. of Hg and then under a pressure of less than 20 mm. of Hg, ending up with a residuum weighing 2.59 parts.

A mixture comprising 4.0 parts of chlorinated furfural and 8.0 parts of aqueous (40%) formaldehyde was refluxed for eight hours and then after separating the layers, the organic layer was distilled under a pressure of from 100 to 300 mm. of Hg to yield 2.56 parts of a moderately hard, solid material possessed of a fair reactivity.

A mixture comprising 4.0 parts of chlorinated furfural and 4.0 parts of cotton seed oil was heated to 200° F. for thirty minutes, then at 325° F. for two hours, and finally at 350° F. for about two hours. Considerable quantities of gaseous product (HCl) were evolved. If the mixture be heated for a further period of time then the product passes over into a rubbery composition. Material of this sort by being subjected to temperature in excess of 350° F. for a period of two or more hours can be converted into a material suitable for the manufacture of friction elements and brake blocks.

A mixture comprising 8.0 parts of chlorinated furfural and 24.0 parts of water was refluxed for a period of one hour. The material was in two layers, one in an aqueous phase and the other in an organic phase. The mixture was then subjected to partial distillation under a pressure of 100 to 300 mm. of Hg yielding 3.68 parts of derivative analyzing 26.45 per cent chlorine.

A solution consisting of 4.76 parts of chlorinated furfural dissolved in 7.0 parts of methanol was added to a solution comprising 6.56 parts of anhydrous sodium acetate dissolved in 35.0 parts of methanol. The mixture was then refluxed for one hour and let cooled. The product was suction-filtered, the filtrate being washed with an additional quantity of methanol. The filtrate was then subjected to partial evaporation, first at atmospheric pressure and then under a pressure of from 100 to 300 mm. of Hg. A residuum of 9.0 parts resulted. This latter was then extracted with anhydrous ethyl acetate, filtered and reconcentrated so as to evaporate off the ethyl acetate. The residuum which comprised the main reaction product weighed 4.0 parts and had a chlorine content of approximately 10 per cent.

Anhydrous aluminum chloride, 2.67 parts, was added to a mixture comprising 4.2 parts of chlorinated furfural and 19.39 parts of mono chloro benzene. Approximately one and one-half hours was utilized in introducing the aluminum chloride at the end of which time the mixture was kept cool for an additional thirty minutes, and thereafter, it was refluxed for a period of one hour. The mixture was then cooled to 140° F. and 1.0 part of concentrated hydrochloric acid and 20.0 parts of water were added. The material was refluxed for thirty minutes, the layers separated, the organic layer filtered and the latter then subjected to partial distillation under a pressure of from 100 to 300 mm. of Hg until at an end temperature of 400° F. nothing further distilled over. A yield of 8.33 parts of a highly viscous material resulted.

A mixture comprising 9.52 parts of chlorinated furfural and 1.84 parts of glycerine is heated to 212° F. for a period of two hours, then at 275° F. for a period of one hour, then at 300° F. for a period of one hour, and finally at 300° F. for a period of one hour under a pressure of from 100 to 300 mm. of Hg. Approximately 7.6 parts of a partially de-chlorinated reactive derivative result. The quantity of glycerine employed may be varied between rather wide limits and a time-temperature schedule other than that indicated may be used. Utilizing 9.52 parts of chlorinated furfural and the indicated time-temperature schedule, the following yields of reactive products result, when one utilizes the following respective quantities of glycerine: Parts glycerine—1.23, 1.84, 2.0, 2.5, 3.0, 3.68, 4.0, 4.5, 5.52; the yield of reactive product equals 7.26, 7.6, 7.7, 7.84, 8.39, 9.10, 9.25, 9.55 and 10.57 parts respectively. Reactive products such as the above are capable of curing or setting up such products as sugar, dextrose, corn sugar, formal sugars, caramel, acetine-formaldehyde reaction products, etc.

Additional derivatives and methods of making the same may be found by referring to copending application, Serial No. 466,480.

Numerous reactive derivatives may be prepared out of the saturated halogenation product of the aldehydes of the mono hetero atomic five membered rings by subjecting the same, or a wide variety of derivatives thereof, to electrolytic action in various media.

The saturated halogenation products of the aldehydes of the mono hetero atomic five membered rings as well as the majority of their reactive derivatives may be used per se or in the form of solutions dissolved in stable solvents as benzene, toluene, xylene, chloroform, ethylene dichloride, trichlorethylene, tetrachlorethylene, monochlorbenzene, etc., etc. In many instances it is feasible to utilize (depending upon the reactivity of the curing agent under consideration) potentially reactive solvents as the alcohols, esters, ethers, etc. In some instances aliphatic hydrocarbons may be used to advantage.

For some applications, it is desirable to utilize curing agents in the form of aqueous solutions. The saturated halogenation products of the aldehydes of the mono hetero atomic five membered rings are substantially insoluble in water and furthermore quite readily react with the same so that these agents as such do not lend themselves for the preparation of aqueous solutions. On the other hand numerous of the reactive derivatives of the aforesaid halogenated aldehydes lend themselves to the preparation of aqueous solutions. This is particularly true of the reaction derivatives prepared by reacting the saturated halogenation products of the aldehydes of the mono hetero atomic five membered rings as well as many of their derivatives (particularly the lower polyethers) with polyhydroxy compounds such as glycerol; 1,2,3, butyl glycerol; 1,2,3, pentanetriol; β-ethyl glycerol; pentaglycerol; dimethyl pentaglycerol; 1,4,5 hexanetriol; various haloid esters of glycerol and its homologues; various ethers of glycerol and its homologues; nitroisobutyl glycerol; 1-amino-propanediol; 2-amino-tert-butane diol; 1,3-teramethyl-diamino-2-nitropropane diol; dihydroxy ketones; diglycerol; polyglycerol; pentaerythritol; sorbitol; mannitol; dulcitol; rhamnitol hepta hydric alcohols; octa hydric alcohols, etc.

There are other instances where it is desirable to utilize the curing agents in the form of aqueous dispersions. It is not practical to prepare such dispersions directly out of the saturated halogenation products of the aldehydes of the mono hetero atomic five membered rings. However, such dispersions may be prepared out of selected derivatives, more particularly those prepared by reacting the aforesaid halogenated aldehydes with polyhydroxy compounds or polyhydroxy compounds containing a small number of other hydrophilic groups, e. g., amino groups, etc. For this purpose the reaction should be carried out until the reaction products which are usually initially water-soluble become either partially insoluble in water or substantially wholly insoluble in water. Such products may then be dispersed in water to yield suitable dispersions or emulsions in the usual manner either through the use of dispersing agents or stabilizing agents.

As the reactive polymeric material for use with the aforedescribed "curing agents" one may utilize any one of the innumerable polymers which contain the requisite potentially reactive atomic groups in adequate number. Through the teachings of the present invention it is possible to procure an almost limitless number of potentially reactive curable polymer compositions from types of polymeric materials that have heretofore been considered uncurable, that is incapable of being converted to an infusible, infusible thermo rigid, or vulcanized rubbery state. Besides the many currently available and well known polymers one may effectively and advantageously utilize the curable polymers made in accordance with the teachings set forth in another of the present inventors' copending applications, Serial No. 495,036.

Essential to the operation of the present invention is the requisite that the organic polymeric material component of the potentially reactive compositions of the present invention must contain within its structure, i. e., have bound to itself, via covalent bonds, an adequate number of "appropriate potentially reactive atomic groups." When the alluded to "appropriate potentially reactive atomic groups" are present in adequate number in the structure of the polymeric material the presence of said groups imparts to the polymeric material a susceptance to cure via reaction with the saturated halogenation products of the aldehydes of the mono hetero atomic five membered rings and their reactive derivatives, so that as a result of the inter-reactions that occur during the process of cure, the mixture is converted over into an infusible and insoluble or vulcanized rubbery state. In the interests of specificness, that portion of the above referred to "appropriate potentially reactive atomic groups" which constitutes the point of reaction with the referred to halogenated curing agents may be referred to as the "appropriate functionally reactive atomic group" while the remaining portions or fragments of the group may conveniently be referred to as "non-reactive atomic groups." The "appropriate potentially reactive atomic groups" are nothing more or less than the groups known to enter into reaction with the saturated halogenation products of the aldehydes of the mono hetero atomic five membered rings and their reactive derivatives. The groups known to be possessed of the above-alluded to requisite reactivity are generally and specifically listed in United States Patent Nos. 2,475,801 and 2,490,462 and, for convenience, a detailed listing has been included in the specifications.

For the purpose of the present invention the term, "via co-valent bonds" has reference to inter-atomic ties which depend upon the primary valence bonds or forces as distinct from the less potent bonding effects due to secondary forces (Van der Waals forces, etc.).

In accord with the foregoing definitions, it is seen that a potentially reactive atomic group may be divided into two parts: (1) the functionally reactive portion which contains the atoms directly involved in the mechanism of cure and (2) the non-reactive portion which embraces the atoms not directly participating in the process of cure. In its most elemental form the potentially reactive atomic group would not include a non-reactive atomic group and thus, by definition, would constitute per se a functionally reactive atomic group. As will be pointed out in greater detail below, of the innumerable functionally reactive atomic groups, the following are the commonest and best known: —OH, —NH$_2$, —NH—, —SH, and —SeH.

The complexity of the potentially reactive atomic groups is well brought out in the list below which is purely illustrative and by no means exhaustive. The following glossary defines the symbols:

—C—C—C—C— = fragment of a chain polymer (illustrative)

A, A$_1$, A$_2$ = functionally reactive atomic groups, e. g., —OH, —NH$_2$, —NH—, —SH, —SeH, =NH, —TeH, —CONH$_2$, —CNHNH$_2$, etc., etc.

R, R$_1$, R$_2$ = non-reactive atomic groups.

Using the above symbols we depict below chain fragments having attached thereto, via covalent bonds, potentially reactive atomic groups: (These representations are purely illustrative).

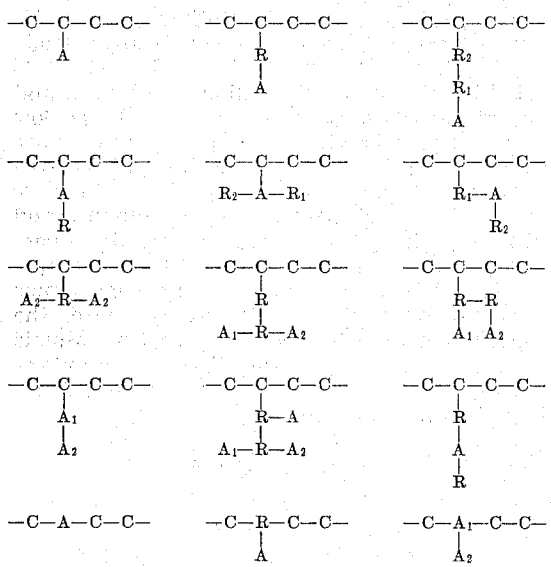

In some instances it is possible to introduce a potentially reactive atomic group of the functionally reactive atomic group type directly into the polymeric structure in the process of polymerization or condensation so that it constitutes an essential linking element of the chain. This possibility is most easily realized only in the case of atoms with three or more valences, e. g., tri-valent nitrogen. Thus, nitrogen permits building a chain structure which comprises elements such as —C—NH—C— as essential links of a linear chain. The superpolyamides (e. g., nylon) are of this type and are susceptible to cure by the referred to halogenated curing agents.

The potentially reactive atomic group may contain within itself virtually any of the known chemical structures. We believe that any organic structure, whatever its nature, if it can be contained within the potentially reactive atomic group, may be utilized. These same remarks apply to the more detailed or specialized atomic groupings and configurations commonly known as organic complexes, radicals, groups, etc.

The potentially reactive atomic group may embrace aliphatic structures, carbocyclic structures, heterocyclic structures, or various combinations of the same. A wide variety of inorganic complexes may also be included. The potentially reactive atomic group may belong to any one of the following classes as well as to classes not here listed: acetals; acid anhydrides; acid halides; alcohols; aldehydes; amides; amidoximes; amines; anhydrides; azo compounds; azoxy compounds; nitrogenous bases; carbylamines; cyanates; cyano derivatives; cyclic compounds with side chains; diazoamino compounds; diazoates; diazo compounds; diazonium compounds; disulfides; epoxy derivatives; esters; ethers; guanidine derivatives; halogen derivatives; heterocyclic compounds; hydrazides; hydrazine derivatives; hydrazo compounds; hydrazones; hydroxylamine derivatives; imides; isocyanates; isocyanides; isonitriles; isothiocyanates; ketenes; ketones; mercaptans; metal-organic compounds; nitriles; nitro derivatives; nitroso derivatives; onium compounds; organometallic compounds; osazones; oximes; oximes of amides; pentazdienes; phenols; phosphorous compounds; quinones; semicarbazones; sulfides; sulfones; sulfonic acids; sulfoxides; tetrazanes and tetrazones; thio acids; thioaldehydes; thiocyanates; thioketones; thiols; thiones; triazenes; urea derivatives, etc.

The potentially reactive atomic groups may embrace one or more of any of the well known organic radicals. Any of the known radicals may be included. The following radicals, listed alphabetically (where more than one term is in use for a particular radical, each term is listed separately), are typical: acenaphthenyl; acetamido; acetenyl; acetimido; acetonyl; acetonylidene; acetoxy; acetyl; acetylene; acridyl; acrylyl; adipyl; alanyl; aldo; alkoxy; alkylthio; allyl; β-allyl; amidoxalyl; amino; amoxy; amyl; tert-amyl; amylidene; anilino; anisal; anisoyl; anisyl; anthranilo; anthranoyl; anthraquinonyl; anthryl; anthrylene; antimono; antipyryl; arseno; arsenoso; arsinico; arsino; arso; arsono; arsylene; arsaryl; asparagyl; aspartyl; auro; azimino; azido; azino; azo; azoxy; benzal; benzamido; benzenyl; benzidino; benzilyl; benzimidazolyl; benzimido; benzofuryl; benzohydryl; benzohydrylidene; benzopyranyl; benzoxazolyl; benzoxy; benzoyl; benzoylene; benzyl; benzylidene; biphenylene; biphenylene-disazo; bornyl; boryl; bromo; 1-butenyl; 2-butenyl; 3-butenyl; butoxy; butyl; sec-butyl; tert-butyl; butylene; butylidene; butyryl; camphanyl; camphoroyl; camphoryl; camphorylidene; caproyl; capryl; caprylyl; carbamido; carbamyl; carbanilino; carbazyl; carbethoxy; carbomethoxy; carbonyl; carbonyldioxy; carboxy; carbyl; carvacryl; catyl; chloro; chloromercuri; cinnamal; cinnamanyl; cinnamyl; cinnamylidene; citral; cresotyl; cresoxy; cresyl; cresylene; crotonyl; cumal; cumenyl; cumidino; cuminal; cyano; cyclobutyl; cyclohexadienyl; cyclohexadienylidene; cyclohexenyl; cyclohexyl; cyclohexylidene; cyclopentenyl; cyclopentyl; cyclopropyl; cyml; 2-p-cymyl; 3-p-cymyl; desyl; diazo; diazoamino; diazoxy; dithio; duryl; durylene; epoxy; ethene; ethenyl; ethoxalyl; ethoxy; ethyl; ethylene; ethylenedioxy; ethylidene; ethylidyne; ethynyl; ethynylene; fenchyl; fluoro; fluoryl; fluorylidene; formamido; formazyl; formyl; fural; furfural; furfuryl; furfurylidene; 2-furoyl; 3-furoyl; furyl; furylidene; geranyl; glutamyl; glutaryl; glyceryl; glycolyl; glycyl; glyoxyl; guaiacyl; guanido; guanyl; halogeno; hendecyl; heptyl; hexadecyl; hexyl; hippuryl; homopiperonyl; hydrazi; hydrazino; hydrazo; hydrazono; hydroxamino; hydroxy; imidazolyl; imino; indanyl; indenyl; indolyl; indolylidene; indyl; indylidene; iodo; iodoso; iodoxy; isoallyl; isoamoxy; isoamyl; isoamylidene; isobutenyl; isobutoxy; isobutyl; isobutyryl; isocyano; isodiazo; isohexyl; isoindyl; isoleucyl; isonitro; isonitroso; 1-isopentenyl; isophthalal; isopropenyl; isopropoxy; isopropyl; isopropylidene; isoquinolyl; isothiocyano; isovaleryl; isoxazolyl; keto; leucyl; malonyl; menthyl; mercapto; mercuri; α-mesityl; 2 - mesityl; methene; methenyl; methionyl; methoxy; methyl; methylene; methylenedioxy; methylidyne; methylol; naphthal; naphthalimido; naphthenyl; naphthobenzyl; naphthoxy; naphthoyl; naphthyl; naphthylene; naphthylidene; nitramino; nitrilo; nitro; aci-nitro; nitroso; norcamphanyl; octyl; oxalyl; oxamido; oxyamyl; oximido; oxo; oxy; pentamethylene; pentazyl; pentenyl; pentyl; perimidyl; perthio; phenacyl; phenacylidene; phenanthryl; phenanthrylene; phenenyl; phenethyl; phenetidino; phenetyl; phenoxy; phenyl; phenylazo; phenylcarbamido; phenylene; phenylenedisazo; phenylidene; phenylureido; phospharseno; phosphazo; phosphinico; phosphino; phospho; phosphono; phosphoro; phosphoroso; phthalal; phthalamido; phthalidene; phthalidyl; phthalimido; phthalyl; picryl; piperidyl; piperonyl; piperonylidene; pivalyl; prolyl; propargyl; prophenyl; propenylidene; propiolyl; propionyl; propoxy; propyl; propylene; propylidene; pseudoallyl; as-pseudodocumyl; s-pseudocumyl; v-pseudocumyl; pseudoindyl; pyranyl; pyridyl; pyridylidene; pyrimidyl; pyromucyl; pyrrolidyl; pyrroyl; pyrryl; quinolyl; quinonyl; quinoxalyl; salicyl; salicylal; salicylyl; selenino; seleninyl; seleno; selenocyano; selenono; selenonyl; selenyl; semicarbazido; silicono; silicyl; silicylene; stannyl; stearyl; stibarseno; stibinico; stibino; stibo; stibono; stiboso; stibylene; styrene; styryl; succinanyl; succinyl; sulfamino; sulfamyl; sulfhydryl; sulfino; sulfinyl; sulfo; sulfonamido; sulfonyl; tauryl; telluro; terephthalal; tetramethylene; tetrazyl; thenoyl; thiazyl; thienyl; thio; thiocarbonyl; thiocyano; thiohydroxy; thiol; thiono; thionyl; thujyl; thymyl; toloxy; toluino; toluyl; α-toluyl; tolyl; α-tolyl; tolylene; α-tolylene; triazeno; triazinyl; triazo; triazolyl; trimethylene; tryptophyl; tyrosyl; undecyl; uramino; ureido; ureylene; valeryl; valyl; vanillal; vanilloyl; vanillyl; veratral; veratroyl; veratryl; veratrylidene; vinyl; vinylene; vinylidene; xanthyl; xyloyl; xylyl; xylylene; etc.

Many of the above listed radicals may be present in the potentially reactive atomic group as "functionally reactive atomic groups." Others are non-functional and may, therefore, be referred to as "non-reactive atomic groups." It becomes clear from the above considerations that a virtually unlimited number of structural possibilities exists. In spite of this apparent complexity in practice the problems reduce themselves to much simpler elements. The following principles constitute a helpful guide in selecting potentially reactive atomic groups: (1) the potentially reactive atomic group should be kept as small as possible, (2) the potentially reactive atomic group should not contain any unnecessary non-reactive atomic groups, (3) the potentially reactive atomic group should as nearly as possible consist of nothing more than functionally reactive groups, (4) the simpler functionally reactive atomic groups are preferred. This includes the radicals —OH, —NH₂, —NH—, =NH, —CONH₂, —CSNH₂, —SH—, —SeH, —TeH, —PH₂, —OX (X equals hydrogen or a metallic element, preferably more electropositive than hydrogen in the E. M. F. series), etc.

The above rules are an aid in the selection of polymeric substances susceptible to cure and suitable for use in the present invention.

The following summarizations and generalizations are of interest in connection with the structures of "functionally reactive groups." (1) With perhaps but a few exceptions functionally reactive atomic groups consist of more than one atom. (2) Usually at least one of the atoms is di- or poly-valent. (3) Inasmuch as the majority of polymers are of an organic nature and thus contain a multiplicity of carbon to carbon links, it follows that those atoms that permit of most ready attachment to a carbon atom are most suitable for use. (4) As a corollary to (1), (2), and (3) the majority of metallic elements as well as the mono valent halides are not particularly adapted for use as functionally reactive linking atoms between the polymer and the already referred to halogenated curing agents. (5) Experience has indicated that the elements, oxygen, sulphur, selenium, and tellurium of the sixth group of elements as well as the elements nitrogen, phosphorous, arsenic, antimony, and bismuth of the fifth group of elements are preeminently suitable for use. (6) Of the elements listed in (5) only oxygen, sulphur, nitrogen, and phosphorous are abundantly available at low costs. It is more difficult to utilize phosphorous atoms as compared to the ease with which nitrogen, oxygen, and sulphur can be used. Of these three favored elements, oxygen, sulphur, and nitrogen, it is found that the nitrogen atoms permit of the greatest variety of structural arrangements followed by sulphur. The oxygen atoms permit of relatively little leeway as regards the construction of functionally reactive atomic groups. In the instance of nitrogen, the following atomic structures are feasible for use as functionally reactive groups:

1. —NO
   Nitroso (usually slow)

2. —NHOH
   B-hydroxylamine

3. —NH₂
   Amino

4. —NHNO₂
   Nitroamine

5. —N(OH)NO
   Nitroso-D-hydroxylamine

6. —NHNO
   Nitrosamine

7. —N=NOH, —NHNO, or —N(OH)=N
   Diazo

8. —N=NH
   Azo

9. 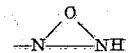
   Azoxy (usually slow)

10. —NHNH₂
    Hydrazin

11. —N(NO)NH₂
    Nitroso-hydrazin

12. —N=NNH₂
    Diazo-amino

13. —N=N—NHOH
    Diazo-oxy-amino

14. 
    Diazo-imido (usually slow)

15. —N=NNHNH₂
    Diazo-hydrazo

16. —NHN=NNH₂
    Tetrazone

17. —N=N—NH—N=NH
    Bis-diazo-amino

18. —N=NNHN=NNHN=NH
    Bis-diazo-tetrazone

It is interesting to note that out of the eighteen atomic arrangements presented only about six are known definitely to exist in the form of inorganic compounds—the presence of the organic complexes permitting comparatively stable and isolatible existence of other configurations. The element sulphur, while not quite as versatile as the element nitrogen, also permits of a considerable scope in building readily identifiable atomic structures that are functionally reactive for the purpose of the present invention. It is noted that not infrequently structures based upon sulphur are possessed of an undesirable odor which militates against the use of this element in constructing the functionally reactive atomic groups. Oxygen, one of the most desirable elements, permits of the production of only a few functionally reactive groups, first and foremost of which is the —OH group (and its equivalents wherein the hydrogen is replaced by a metallic element, etc.), others being the peroxide and super-peroxide groups and in some instances reactive ether linkages. It is also feasible to produce a considerable number of functionally reactive groups which utilize two or more of the preferred elements, e. g., oxygen and sulphur; oxygen and nitrogen; nitrogen and sulphur; oxygen, nitrogen, and sulphur. (7) The elements oxygen, nitrogen, and sulphur have been listed as the preferred ones for use in forming functionally reactive atomic groups suitable for use in the present invention. It should be emphasized, however, that virtually all the other known elements with the exception of the inert gases can be utilized in the construction of functionally reactive atomic groups. Applications occasionally arise where it is desirable to utilize an element other than the three preferred ones, not withstanding, in general, the greater cost and difficulty in constructing and incorporating such atomic groupings into the polymer. (8) Among the favored functionally reactive atomic groups utilizing the above referred to preferred elements are those that have one or more hydrogen elements attached directly to the same. As has already been pointed out the substitution of an element more electro-positive than hydrogen increases the potential reactivity of the group. (9) The element nitrogen permits of the construction of the most reactive groups due to the ease with which basic or alkaline structures can be formed. In general, functionally reactive atomic groups that are of an alkaline nature enter into more ready reaction. On the other hand the ultimate curing or vulcanizing potentiality inherent in the system of a functionally reactive atomic group and a saturated halogenation product of the aldehydes of the mono hetero atomic five membered rings and their reactive derivatives, as well as the strength of the covalent bond is practically independent of the precise atoms contained in the reactive group. Although the element, nitrogen, contributes mostly to diversification as to structural constitution, the element of oxygen is in some respects preferred due to the fact that many of the more complex nitrogen containing potentially reactive atomic groups may, under unfavorable circumstances undergo a decoupling effect which has no counterpart when oxygen is used as the interlink. (10) It is noteworthy that many of the functionally reactive atomic groups utilizing nitrogen are quite basic or alkaline in character. On the other hand many of the nitrogen containing reactive groups are virtually neutral in character. Alternatively many of the reactive groups based upon oxygen are substantially neutral in character whereas others are distinctly acidic. The susceptance to cure and the mechanism of cure itself appears to be independent of whether the functionally reactive atomic group or, for that matter, the potentially reactive atomic group in toto, be alkaline, neutral, or acid in character. The alkaline types are the more readily reactive but are not necessarily to be preferred inasmuch as undesirable reactions may occur.

Non-reactive atomic groups may be included for reasons that are purely incidental or else they may be deliberately included for specific functional reasons. Thus, the non-reactive atomic group may be of a type that attributes to plasticization, solvency, water repellent properties, optical properties, color, as well as a wide variety of other physical and chemical properties.

It is impractical to list in the present specifications all of the materials which when co-valently bound to a polymeric structure impart to the same the requisite susceptance to cure and thereby render the curable polymer suitable for use as the co-reactive polymeric component of the compositions of the present invention. Inasmuch as the presence of a "functionally reactive atomic group" in the potentially reactive atomic group is the deciding factor in determining whether or not a given atomic group contained in a polymeric material renders the latter suitable for use in the present invention, we list below typical and representative atomic groups, structures, radicals, and compounds that are functionally capable of reacting with the saturated halogenation products of the aldehydes of the mono hetero atomic five membered rings and their reactive derivatives. When such structures are present in a polymer in adequate quantities the latter can be cured to an infusible, influsible thermo rigid or a culcanized rubbery state through the use of the above referred to halogenation products as curing agents. It will be observed that in many instances the structures listed below are of a complex type and that not infrequently there are present atoms and molecular fragments that are perhaps "non-reactive" so far as direct inter-reaction with the already alluded to halogenation products are concerned. However, due to secondary effects, the presence of such seemingly non-reactive groups often exerts a profound effect upon the functionally reactive atomic groups that directly engage in the reaction, so that the structural unit as a whole becomes endowed with properties that are new and novel and distinct from those of the directly reacting functional group when considered per se. Thus, by way of example, the alcoholic (OH) group is a functionally reactive atomic group for the purposes of the present invention. However the hydroxy group in —$C_6H_4$(OH) is, as is well known, more acidic in character than the alcoholic (OH) group. Going a step further and attaching the electro negative nitro group (—$NO_2$) to the aromatic ring, resulting in a structure such as —$C_6H_3(NO_2)$(OH), yields a compound that is even more acidic. In each instance neither the phenyl nor the nitro group directly engage in reactions of neutralization yet they manifestly exert an effect upon the reactivity. In a perfectly analogous manner the presence of atomic groups that do not directly engage in reaction with the alluded to halogenation products disassociating the secondary effect from the primary effect that it has been thought best to list the atomic groups, structures, radicals, and compounds in the manner indicated. As an aid in selecting functionally reactive structures we have noted those that are comparatively slow or mild in their reactivity. For convenience the materials are listed according to their chemical inter-relationships (where more than one term is in use for a particular material, each term is listed separately): alcoholic hydroxy; phenolic hydroxyl; amino; sulfhydryl; selenohydryl; telurohydryl; mercaptan; thiol; thio ether; sulphonium; sulphoxide; sulphone; alkyl thiosulphuric; alkyl thiosulphonic; selenomercaptan; selenide; selenite; telluride; dialkyl tellurium oxide; dialkyl tellurone; nitrohydroxy; nitroamino; nitroso; nitro nitroso; alkyl ammonium; acid amide; isocyanates; isothiocyanates; isonitriles; primary amine; secondary amine; tertiary amine; tetralkylammonium base groups; unsaturated amine and ammonium base groups; n-halogen alkylamine groups; thiodialkyl amine; alkylthionylamine; thionyl dialkylamines; alkyl sulphamides; dialkylaminochlorophosphines; dialkylaminoxychlorophosphines; dialkylaminosulphochlorophosphenines; the arsenic, boron (usually slow) and silicon (usually slow) derivatives of secondary amines; nitroso amines; nitrimines; alkyl hydrazine; nitroalkylhydrazine; alkyl diazo; alkyl diazomides; diazoamino tetralkyltetrazone; alkyl and hydroxylamines; trialkylamine oxides; nitroso-β-alkylhydroxyamines; phosphines; primary, secondary and tertiary; alkyl phosphonium; alkyl phosphinic; alkyl phosphine oxides; alkarsine; trialkylarsine; alkylarsonic; monoalkylarsine; dialkylarsine; cacodylhalides; quaternary alkylarsonium; tertiary stibenes; trialkyl stibene oxide; trialkyl stibene sulphide; trialkyl stibene halide; quaternary stibonium; tertiary bismuthines; alkyl bismuth oxide; alkyl silicane; trialkyl silicon alkoxides; hexa alkyl silane (usually slow); dialkyl silicon oxide; alkyl derivatives of germanium; alkyl derivatives of tin, e. g., dialkyl tin, tetra alkyl tin; hexa alkyl stannane (slow); alkyl stannonic; alkyl tin tri halide; alkyl derivatives of lead, e. g., tetra alkyl lead, tri alkyl lead halide; alkyl derivatives of boron; alkyl derivatives of aluminum, e. g., tri alkyl aluminum; aluminum alkoxides; tri alkyl thallium; tri alkyl thallium; thallium di alkyl halides; alkyl derivatives of beryllium; alkyl derivatives of magnesium; magnesium di alkyls; magnesium alkyl halides; alkyl derivatives of zinc; alkyl derivatives of cadmium; alkyl derivatives of mercury; mercury alkyl halides (slow); alkyl derivatives of calcium; aldehyde; many thio aldehyde structures; halogen substituted aldehyde (slow); aldehyde peroxides (slow); alcoholates; acetal (slow); aldehyde di halides (usually slow); most sulphur derivatives of the saturated and unsaturated aldehydes (slow) including thio aldehydes (slow) and their sulphones (slow); sulphoxides (slow); sulphenes of the trithioaldehydes; mercaptal; hydroxy sulphonic; di sulphonic acids of the aldehydes (slow); structures derived from ammonia and alkylamines with aldehydes; aldoximes; diazo paraffins; hydrazones; azines; aldazines; phenyl hydrazones; ketone (slow); many of the halogen substitution products of the ketones (slow); many ketone acetals (slow) and ketone halides (slow); many sulphur derivatives of the ketones (usually slow), e. g., mercaptoles; many nitrogen derivatives of the ketones, e. g., hydroxylamine derivatives; hydrazine derivatives; ketone phenylhydrazones; ketone semi-carbazone; most ketene structures; keten acetals; structures resulting from the action of ammonia on acetone; mesityl oxide; and phorone; hydroxy acid; thio acids (usually slow); acid amides; many acid nitriles (usually very slow); salts of carboxylic acids or their sulphur equivalents (usually slow); per acids (slow); acyl peroxides (slow); thio acids (slow); amino thio acids; acetyl sulphides (usually slow); di thio acids (usually slow); primary, secondary and tertiary amides; acid hydrazides; acid azides (usually very slow); amido chlorides, imido chlorides; amino-ether; thiamide; thio-imido ether; imide; amidine; hydroxamic acids and their chlorides; amidoxime; hydroxamic oximes; nitrosoximine; glycol; unsaturated glycol; glycol ethers, e. g., glycol amino ethyl ether; cyclic ethers of the glycols; semi esters of glycols; sulphur derivatives of glycols including the mercaptans; sulphides; sulphurans; cyclic sulphides; sulphonium derivatives; sulphones includes the open chain and cyclic types, etc.; nitrogen derivatives of the glycols, e. g., nitroso derivatives; nitro derivatives; their amines and ammonium compounds, e. g., hydroxyl alkyl amines; dialkyl imine oxide, mono alcohols; halogen alkylamines; alkylene diamines; cyclic imines; e. g., alkylene monimines, including the piperidine derivatives; hydroxy aldehydes; nitrogen derivatives of the hydroxy aldehydes including the nitro and amino aldehydes; ketone alcohols, e. g., 1:2-ketol, 1:3-ketol; olefin ketols; nitrogen derivatives of ketols, e. g., nitro ketones (usually slow) and amino ketones; many di aldehydes (usually slow); ketone aldehydes, and di ketones, and most of their nitrogen containing derivatives as well as sulphur equivalents (usually slow), e. g., the monoximes, isoxazole; alpha dioximes; etc.; hydrazine; hydroxy acids and many of their derivatives including the acid esters of the hydroxy acids; halogen hydroxy acids; many gamma and delta hydroxy acids and their cyclic esters; the lactones (usually slow); sulphur derivatives of the hydroxy acids, e. g., mercaptan carboxylic acid (usually slow); sulphide (usually slow) dicarboxylic acid (usually slow); also the selenides; most of the nitrogen derivatives of the hydroxy acids including the hydroxylamines or hydroxylamides; alpha hydroxy-imidohydrines; hydrazides of the hydroxy acids; amides of the hydroxy acids; nitriles of the hydroxy acids; aldehyde cyanohydrins; ketone cyanohydrins; amino acids; polypeptide; lactam (slow); the unsaturated hydroxy acids and their derivatives corresponding to the above; most of the aldehyde acids (usually slow) and many of their derivatives particularly those of nitrogen; many of the ketone carboxylic acids (usually slow) and their derivatives particularly those of nitrogen; acetoacetic acid (usually slow) and its homologues as well as many of their derivatives, e. g., phenyl methyl pyrazolone; various carbonic acid derivatives, e. g., thio carbonic acid (slow), sulphothiocarbonic acid (slow); trithiocarbonic chlorides of sulphocarbonic acids (slow); salts and esters of the sulphur derivatives of ortho carbonic acids (usually slow); amides of carbonic acid; e. g. amino-formic (carbamic) esters, e. g. urethane; alkyl urethane; alkylidene urethane; di urethane; nitro and nitroso urethane; urea chlorides; urea and many of its derivatives, e. g., alkyl urea; cyclic alkylene urea derivatives; nitroso ureas; ureides; ureides of hydroxy acids; hydantoin; homologues and derivatives of amino carbamic acids; derivatives of iso urea, semi carbazides; azo di carboxylic acids; carbamic acid azide; hydroxylamine derivatives of carbamic acid; sulphur derivatives of carbamic acid and urea, e. g., thio carbamic acids and their sulphur and oxygen esters; alkyl thio carbamic esters; di thio urethane; cyclic derivatives of di thio carbamic acid; derivatives of pseudo thio carbamide, etc.; guanidine and its derivatives, e. g., nitro hydroxy and amido hydroxy guanidines and their transposition products; many nitriles (usually very slow); amides of carbonic and thio carbonic acid; many oxygen derivatives of cyanogen and their isomerides (usually very slow); cyanuric acid and its alkylic derivatives (usually very slow); sulphur compounds of cyanogen and its isomers (usually very slow); mustard oil groups (usually very slow); cyanamide (usually very slow) and the amides of cyanuric acid; many of the derivatives of di carboxylic acids particularly the hydroxy and amino products; tri hydric alcoholic structures and most of their derivatives which leave at least one hydroxy group free or which contain groups such as the amino, etc. e. g., tetra methyl diamino beta nitropropane; di hydroxy aldehydes; di hydroxy ketones; hydroxy di aldehydes; hydroxy aldehyde ketones; hydroxy di ketone; di aldehyde ketone (usually very slow); aldehyde di ketone (usually very slow); tri ketones (usually slow); di hydroxy amino carboxylic acids; amino hydroxy carboxylic acids; diamino carboxylic acids; aldo carboxylic acids (usually very slow) and hydroxy keto carboxylic acids; aldehydo-keto-carboxylic acids (usually very slow); di keto carboxylic acid (usually very slow); hydroxy di carboxylic acids; aldo dicarboxylic acids (usually very slow); ketone-dicarboxylic acids (usually very slow); uric acid and most of its derivatives; tetra hydric alcohols and various of their oxidation products and derivatives particularly those containing nitrogen; compounds containing five or more hydroxy groups as well as most of their derivatives particularly those containing nitrogen.

It will be observed that many of the structures embraced by the radicals, groups or compounds in the foregoing list are of an aliphatic character. Of equal import, however, are the corresponding carbocyclic and heterocyclic compounds which, due to space limitations, are not here specifically listed. Included in this category are functionally reactive compounds analogous to the foregoing aliphatic materials but derived from or belonging to one or more of the following classes of carbocyclic compounds: tri, tetra, hepta, octa, and nono carbocyclic compounds or more specifically, mononuclear aromatic substances derived from benzene, halogen derivatives of the benzene hydrocarbon, nitrogen derivatives of benzene hydrocarbons, aromatic compounds of phosphorous, arsenic, antimony, bismuth, boron, silicon, tin, phenyl metal derivatives, sulphonic acids; phenols; quinones; phenyl paraffin alcohols and their oxidation products including the monohydric phenyl paraffin alcohols and their oxidation products; derivatives of the aromatic amino carboxylic acids; substituted aromatic monocarboxylic acids; mono hydric oxy phenyl paraffin alcohols and their oxidation products; polyhydric aromatic alcohols in which only one hydroxyl is present in each side chain and their oxidation products; aromatic polyalcohols containing more than one hydroxy group in the same side chain and their oxidation products; mononuclear aromatic substances with unsaturated side chains; hydro aromatic substances with single nucleus; hydro benzo derivatives; terpenes; aromatic hydrocarbons containing several nuclei including the phenyl benzyls and the polyphenyl fatty hydrocarbons; e. g., phenyl benzene groups; benzylbenzene group, triphenyl methane group; phenyl derivatives of tri phenyl carbonyl; phenyl bis di phenyl methane; tetra phenyl methane homologues; di and polyphenyl paraffins; aromatic hydrocarbons of the condensed nuclei type including the indene and hydro indene groups; the naphthylene group; the phenanthracine group; the fluorene group and the anthracene group.

In an analogous manner compounds corresponding to the aforementioned aliphatic substances but derived from one or more of the following heterocyclic compounds may be utilized. Here we include rings with an oxygen member, rings with a sulphur member, rings with one nitrogen member, rings with two nitrogen members, rings with an oxygen and a nitrogen member, three membered heterocyclic substances, four membered heterocyclic substances, five membered heterocyclic substances, and six membered heterocyclic substances. More specifically may be mentioned the three membered heterocyclic compounds including the mono hetero atomic three membered rings and the di hetero atomic three membered rings; four membered heterocyclic substances including the mono hetero atomic four membered rings and the di hetero atomic four membered rings; five membered hetero cyclic substances including the mono hetero atomic five membered rings embracing the furane group, thiophen group, selenophen group, pyrrole group, benzo furane group, benzo thiophen group, benzo pyrrole or indene group including the hydro indole derivatives, di benzo furane or di phenylene oxide group; di benzo thiophen or di phenylene sulphide group; di benzo pyrrole, di phenylimine or carbazole group; poly hetero atomic five membered rings including the pyrazole group, indazoles, isoxazole group, indoxazene or benzisoxazole group, glyoxalines, benzo glyoxalines, oxazoles, benzoxalines, oxazoles, benzoxazoles, thiazoles, benzothiazoles, osotriazoles, pyrro-(AB)-diazoles, sym-triazoles, furazans, azoximes, oxydiozoles, furo-(AB)-diazoles, thio-(AB)-diazoles, thio-(BB)-diazoles, thio-(AA)-diazoles, thio-(ABB)-triazoles, tetrazoles; six membered heterocyclic compounds including six membered rings with an oxygen member, six membered rings with a sulphur member, six membered rings containing a nitrogen member including the pyridine group, quinoline group, condensed quinolines, isoquinoline group, phenanthridine naphthyridines, naphthinolines, quindolines, acridine group, anthrapyridines; the synthetic equivalent of the vegetable alkaloids; poly hetero atomic six membered rings including the oxazines, thiazines, diazines, triazines, tetrazines, poly hetero atomic six membered rings containing an oxygen and sulphur member; seven, eight and many membered heterocyclic substances.

A functionally reactive atomic group may at one and the same time partake of the attributes associated with more than one class of compounds, thus it may be inorganic, saturated aliphatic, unsaturated aliphatic, carbocyclic, heterocyclic, aliphatic plus carbocyclic, aliphatic plus heterocyclic, carbocyclic plus heterocyclic, or aliphatic plus carbocyclic plus heterocyclic, etc. The vast majority of the metal-organic structures behave as functionally reactive atomic groups. This includes the metal-organic compounds of aluminum, antimony, arsenic, beryllium, bismuth, boron, cadmium, calcium, cobalt, copper, gallium, germanium, gold, indium, lanthanum, lead, lithium, mercury, neodynium, potassium, rhenium, silicon, sodium, tellurium, thallium, tin, zinc. Experimentation has shown that the metallic compounds in the nature of salts or oxy derivatives, e. g., of carboxylic acids or their equivalents, alcoholic (OH) groups, phenolic (OH) groups, amino groups, etc., in all of which instances the metal element has replaced a hydrogen atom (active hydrogen) the resultant substance is usually more reactive than the original substance. Thus, while the group —CH₂OH reacts quite readily with the saturated halogenation products of the aldehydes of the mono hetero atomic five membered rings, structures such as —CH₂ONa or (—CH₂O)₃Al, react much more readily and vigorously (sometimes almost explosively).

It is noteworthy that the inclusion of appropriate aromatic nuclei permits of atomic arrangements that have no counterpart in the field of aliphatic compounds. Included in this category are types of diazo and diazonium structures as well as iodoso, iodoxy, and iodonium hydroxide groupings, all of which for the purpose of the present invention behave as functionally reactive atomic groups.

One may conveniently divide the polymeric substances suitable for use in the present invention into two groups. The one group would comprise the many currently available and well known curable polymeric materials. The other group would comprise polymeric materials that have been rendered susceptible to cure after the manner outlined in copending application, Serial No. 495,036. In the interest of clarity we list below polymeric materials falling into the aforementioned respective groups.

Among the products that fall into the group comprising the polymeric materials that have been rendered susceptible to cure per the disclosures of the copending patent application, Serial No. 495,036, and which are suitable for use in the present invention are those obtained from the polymerization products (homo-polymers, hetero-polymers, copolymers, inter-polymers, etc.) derived from one or more of the following materials:

Ethylene; propene; butenes; pentenes; hexenes; allene; butadiene; butadiene homologues; butadiene derivatives; isoprene; piperylene; acetylene; propine; vinylacetylene (1-butene, -ine-3); divinylacetylene (1,5-hexadiene, -ine-3) and derivatives; cyclopentadiene; cyclohexene; cyclohexadiene; styrenes; methylstyrene (2-phenylpropine-1); styrene homologues; styrene substitution products; propenylbenzene; allyl benzene; methyl-vinylbenzene; divinylbenzene; indene; phellandrene; pinene; cedrene; dihydronaphthalene; tetrahydronaphthalene; alpha-vinylnaphthalene; coumarone; the vinyl halogenides; vinyl chloride; vinyl bromide; allyl chloride; allyl bromide; chloroprene (2-chloro-butadiene-1,3); homologues of chloroprene; bromoprene; chloro derivatives of divinylacetylene; 1,1-dichloro-ethylene; 1,2 - dichloro-butadiene-1,3; 2,3-dichloro-butadiene - 1,3; 1-2,3-trichloro-butadiene - 1,3; vinyl ethinyl carbinols; ethylene oxide; divinyl ethers; vinyl alkyl ethers; vinyl allyl ethers; 2-methoxy-, ethoxy-, and butoxy-butadiene-1,3; p-vinyl-anisole; anethole; 1,1-phenyl-anisylethylene; divinyl sulphoxides; divinyl sulphone; 2 - furfurylmercaptan; vinylamines; isopropenylaniline; aldehydes; glyoxal; methylglyoxals; acrolein; methylacrolein; alkyl-vinyl-ketones; propenyl methyl ketone; isopropyl methyl ketone; mesityl oxide; cyclohexene oxide; acrylic acid, acrylic esters; methacrylic acids; methacrylic esters; halogen substitution products of acrylic acids and its esters; halogen substitution products of methacrylic acids and its esters; homologues of acrylic acids; homologues of methacrylic acids; derivatives of acrylic acid; derivatives of methacrylic acid; vinyl acetic acid; allyl acetic acid; undecylenic acid and its esters; sorbic acid and its esters; vinyl propiolic acid; vinyl esters; vinyl acetate; vinyl cyanide; acrylates; haloacrylates; esters of eleostearic acid; 9,11- and 9,12-linoleic acid; muconic acid, its esters and derivatives; 2-butadienyl formate; 2-butadienyl acetate; 2-butadienyl propionate; 2-butadienyl butyrate; 2-butadienyl esters; cinnamic acid and its esters; butadienyl-2-halo esters; e-caprolactone; ketenes; polymerizable organic compounds containing elements such as aluminum, antimony, arsenic, beryllium, bismuth, boron, cadmium, germanium, lead, mercury, nitrogen, phosphorus, selenium, silicon, sulphur, tellurium, thallium, tin, etc.; cyanogen chloride; phosphorus chloronitride; phosphorus fluoronitride; silicic acid esters; etc.

Polymers rendered susceptible to cure via the aforesaid invention but procured through the process of condensation as distinct from that of polymerization are also suitable for use in the present invention. Such condensations may be of the type referred to as isopolycondensations or as heteropolycondensations. These polycondensates may be in the form of linear chains or they may be in the form of two or three dimensional molecular networks. Representative of the products of this category which may be rendered curable and suitable for use in the present invention are the polymeric materials that may be prepared by reacting together mixtures of the following organic compounds:

Dibasic acids plus glycols, polybasic acids plus glycols, dibasic acids plus polyhydroxy compounds, polybasic acids plus polyhydroxy compounds, dibasic acids plus diamines (nylons), polybasic acids plus diamines, dibasic acids plus polyamines, polybasic acids plus polyamines, phenols plus aldehydes, ureas plus aldehydes, melamine plus aldehydes, etc.

Condensation polymers may also be procured from a variety of bi- or poly-functional compounds containing atomic groupings susceptible to interreaction. In this category may be included many polybasic (preferably dibasic) acids capable of yielding linear anhydrides; polyhydroxy (preferably di-hydroxy) compounds capable of yielding linear poly-ethers; compounds simultaneously containing acid and hydroxy groups; compounds simultaneously containing acid and amino groups, etc.

Among the better known of the above polymeric materials which may be rendered curable and suitable for use in the present invention are the polycoumarones; polyindenes; polystyrenes; polyacrylates; polymethacrylates, e. g., methyl methacrylate; polyolefins, polyoxymethylenes; polyvinyls, e. g., polyvinyl chloride, polyvinyl acetate, vinyl acetate - chloride copolymer; phenol-aldehyde resins of the Novolak type; thermoplastic alkyd resins; resinous or rubbery hydrocarbon polymers; resinous or rubbery ethylene polymers; butadiene rubber; butadiene-styrene copolymer rubber (Buna S); butadiene-acrylonitrile copolymer rubber (Buna N); alkyd resins; nylons; polyvinylidene resins; organic silicon containing resins; natural rubber, etc. Note that before the above polymeric materials are suitable for use in the present invention they must first be rendered susceptible to cure, e. g., via the teachings set forth in the already alluded to copending application, Serial No. 495,036.

For the sake of completeness we wish to state that the above condensation and polymerization polymers may be rendered susceptible to cure and usable in the present invention by any of the following methods:

The method of producing polymers curable through the use of the saturated halogenation products of the aldehydes of the mono hetero atomic five membered rings and their reactive derivatives as curing agents from polymers that are normally non-curable, which consists in introducing into the said polymer, via co-valent bonds, potentially reactive atomic groups that are reactable with the said halogenated aldehydes and their reactive derivatives, whereby the thus modified polymer is rendered susceptible to reaction with the said halogenated aldehydes and their reactive derivatives for conversion to the cured state, said potentially reactive atomic groups being present in the proportion of at least one such group per thousand linking atoms of said polymer.

The method of producing polymers curable through the use of the saturated halogenation products of the aldehydes of the mono hetero atomic five membered rings and their reactive derivatives as curing agents from polymers that are normally curable only through the use of agents other than the aforesaid curing agents, which consists in introducing into the said polymer, via co-valent bonds, potentially reactive atomic groups that are reactable with the said halogenated aldehydes and their reactive derivatives, whereby the thus modified polymer is rendered susceptible to reaction with the said halogenated aldehydes and their reactive derivatives for conversion to the cured state, said potentially reactive atomic groups being present in the proportion of at least one such group per thousand linking atoms of said polymer.

The method of producing polymers curable through the use of the saturated halogenation products of the aldehydes of the mono hetero atomic five membered rings and their reactive derivatives as curing agents from compounds that normally yield non-curable polymers, which consists in introducing into the polymer, via interpolymerization during the process of polymer growth, polymerizable compounds containing potentially reactive atomic groups that are reactable with the said halogenated aldehydes and their reactive derivatives, whereby the polymer is rendered susceptible to reaction with the said halogenated aldehydes and their reactive derivatives for conversion to the cured state, said potentially reactive atomic groups being present in the proportion of at least one such group per thousand linking atoms of said polymer.

The method of producing polymers curable through the use of the saturated halogenation products of the aldehydes of the mono hetero atomic five membered rings and their reactive derivatives as curing agents from compounds that normally yield polymers that are curable only through the use of agents other than the aforesaid curing agents, which consists in introducing into the polymer, via interpolymerization during the process of polymer growth, polymerizable compounds containing potentially reactive atomic groups that are reactable with the said halogenated aldehydes and their reactive derivatives, whereby the polymer is rendered susceptible to reaction with the said halogenated aldehydes and their reactive derivatives for conversion to the cured state, said potentially reactive atomic groups being present in the proportion of at least one such group per thousand linking atoms of said polymer.

The method of producing polymers curable through the use of the saturated halogenation products of the aldehydes of the mono hetero atomic five membered rings and their raction derivatives as curing agents from compounds that normally yield non-curable polymers, which consists in introducing into the polymer, via interpolymerization during the process of polymer growth, polymerizable compounds that are non-reactable with the aforesaid halogenated aldehydes and their reactive derivatives and then converting the said polymerizable compounds after incorporation into the polymer, over into the structures containing potentially reactive atomic groups that are reactable with said halogenated aldehydes and their reactive derivatives whereby the polymer is rendered susceptible to reaction with the said halogenated aldehydes and their reactive derivatives for conversion to the cured state, said potentially reactive atomic groups being present in the proportion of at least one such group per thousand linking atoms of said polymer.

The method of producing polymers curable through the use of the saturated halogenation products of the aldehydes of the mono hetero atomic five membered rings and their reactive derivatives as curing agents from compounds that normally yield polymers that are curable only through the use of agents other than the aforesaid curing agents, which consists in introducing into the polymer, via interpolymerization during the process of polymer growth, polymerizable compounds that are non-reactable with the aforesaid halogenated aldehydes and their reactive derivatives and then converting the said polymerizable compounds, after incorporation into the polymer, containing potentially reactive atomic groups that are reactable with said halogenated aldehydes and their reactive derivatives whereby the polymer is rendered susceptible to reaction with the said halogenated aldehydes and their reactive derivatives for conversion to the cured state, said potentially reactive atomic groups being present in the proportion of at least one such group per thousand linking atoms of said polymer.

Representative of the products that fall into the group comprising the currently available and well known curable polymeric materials suitable for use in the present invention are the following: phenol-formaldehyde resins; phenol-aldehyde resins in general; phenol-furfural resins; furfural-formaldehyde phenolic interpolymer resins; guanidine-aldehyde resins; melamine-aldehyde resins; resins derived from urethan; resins derived from acetone-formaldehyde condensations; furfur-acetone resins; resins produced by reacting aldehydes with polyhydroxy phenols, e. g., resorcinol, catachol, hydroquinone, pyrogallol, etc.; various urea resins; alkyd resins derived from polyhydric alcohols and containing free OH groups; in general resins produced by reacting aromatic amines with aliphatic, carbocyclic, or heterocyclic aldehydes, e. g., aniline-formaldehyde resins; resins derived from cashew nut shell liquid or the oil of the marking nut; gum accroides and resins derived therefrom; dragon's blood and resins derived therefrom; butadiene-styrene copolymer rubbers, e. g., Hycar OS-20; butadiene-acrylonitrile copolymer rubbers (Buna N, Perbunan, Hycar OR-15); shellac; shellac derivatives; gelatin; bone glue; hide glue; proteins of all types; casein; casein plastics and glues; polyvinyl alcohol; polyvinyl alcohol-acetate; polyvinyl butyral; polyvinyl butyral-alcohol;

silk; superpolyamides, e. g., nylon; cellulose; esters of cellulose such as cellulose nitrate; cellulose acetate; cellulose propionate; cellulose butyrate; cellulose nitrate-acetate; cellulose acetate-butyrate; cellulose acetate-propionate; cellulose-xanthate; etherification products of cellulose; methyl cellulose; ethylcellulose; benzyl cellulose; propyl cellulose; and in general the products resulting from the interaction of cellulose with alkylating agents such as alkyl halides or aryl alkyl halides in the presence of strong alkalies; hydroxy ethylcellulose; tosyl cellulose; colored ethers prepared by coupling the amino benzyl ether of cellulose with diazonium salts; sodium cellulose glycolate; cellulose glycollic acid; cellulose hydroxy ethyl ether; the mixed derivatives of cellulose prepared by reacting the same with an acid anhydride and an aldehyde simultaneously; cellulose acetals; cellulose ether esters; esterified half acetals; sodium ether derivatives; cellulose addition compounds; amino cellulose; sodium cellulosate; etc., etc.

An inspection of the products listed in the group comprising the well known and currently available curable polymeric materials discloses that virtually all of the known polymeric materials that contain potentially reactive atomic groups are suitable for use in the present invention. It is also to be noted that the list covering the group comprising polymeric materials that may be rendered susceptible to cure via the teachings of the copending patent application, Serial No. 495,036 and thus usable in the present invention is exceedingly extensive. It is clear from the foregoing that a virtually limitless number of polymers may be utilized as the polymeric material component of the potentially reactive curable compositions of the present invention.

In the preparation of the potentially reactive curable compositions of the present invention it is often desirable and not infrequently necessary to include a catalyst or accelerator. For the sake of convenience the catalyst or accelerator will hereinafter simply be referred to as the "catalyst." The primary purpose of such a catalyst is to speed up the rate at which the compositions can be cured at a given temperature. The presence of a catalyst often permits the use of lower curing temperatures in effecting the cure. Experimentation upon an extensive scale has shown that catalysts are more or less selective in their action so that a catalyst that is best suited for use in one composition is not necessarily the best for other compositions. In some instances the catalyst serves other purposes besides merely enhancing the speed of the curing reaction. This is particularly true in instances where the catalyst is possessed of pronounced acid neutralizing properties and where the system (polymeric material plus a saturated halogenation product of the aldehydes of the mono hetero atomic five membered rings or their reactive derivatives as curing agent) is one which liberates acidic materials. In some instances the alkalinity or the acid neutralizing abiilty of a catalyst may be intimately related to its ability to function as a "catalyst." We list below a few representative catalysts.

As has already been pointed out, catalysts are more or less selective in their action. Some catalysts appear to function in a purely catalytic manner, i. e., without any appreciable change occurring in the process of catalysis whereas others at the same time absorb acidic materials and thereby become more or less neutralized whereas others enter into reaction and appear to instill into the composition an activation energy sufficient to initiate a thorough reaction throughout the mass. Very many of the neutral or basic oxides, hydroxides, etc., of the metallic elements function as catalysts to a greater or lesser degree.

Referring first to the oxides and hydroxides of the elements of group I as per the periodic system we wish to state that those of cesium, rubidium, potassium, sodium, and lithium are not very effective and besides possess numerous objectionable features. The oxides and hydroxides of copper are in some instances very effective. Silver oxide does not appear to be effective and besides is objectionable due to its high specific gravity and high cost. The same remarks are applicable to gold.

Experimentation with the elements of group II has shown that the divalent alkaline earth oxides of barium, strontium, and calcium are on the whole possessed of but a moderate activity and are, therefore, not particularly recommended as catalysts. The other elements of group II, mercury, cadmium, zinc, magnesium, and beryllium are all highly effective catalysts. From a practical standpoint the oxides and hydroxides of magnesium and zinc, due to their relative abundance and slight or zero toxicity, are particularly recommended.

None of the oxides or hydroxides of the elements of group III appear to possess an appreciable catalytic effect. Aluminum oxide, however, is very useful as a filler in some of the compositions of the present invention. Other compounds of aluminum, such as technical aluminum stearate, function as blister inhibitors and also as curing agents in certain instances (see co-pending patent application, Serial No. 478,120, filed March 5, 1943 now Patent 2,402,075 issued June 11, 1946). The oxide of boron, as well as numerous other of its compounds particularly those of the glycols, glycerols, etc., while not useful as catalysts, none the less are useful as secondary curing aids in certain instances, e. g., polyvinyl alcohol, polyvinyl butyral, etc.

Of the common elements of group IV, the oxides and hydroxides of tin and lead are possessed of a moderate catalytic effect. The high specific gravity and the toxicity of the lead compounds militates against their use whereas the tin compounds are possessed of a limited selective activity.

Of the common elements of group V the oxides of arsenic, antimony, and bismuth are possessed of definite catalytic properties though on the whole they are inferior to products such as zinc or magnesium oxide.

Of the common elements of group VI the oxides and hydroxy oxides of chromium are effective catalysts. The other elements are possessed of little, if any, catalytic activity as far the the present invention is concerned.

Of the common elements of group VII only the oxides, hydroxides and basic compounds of manganese are catalytically effective.

Of the common elements of group VIII the oxides and hydroxides of iron, cobalt, and nickel are catalytically active. It is interesting to note that of the three elements listed the oxides of iron are the most potent. Red iron oxide is definitely more active than the black iron oxides. It is interesting to note that in spite of the relative stability, neutrality and inertness of red iron oxide it is none the less one of the most active and potent of catalysts.

There are indications that numerous of the rarer earth elements are catalytically active but owing to their scarcity and high cost they can hardly be recommended for commercial usage.

Of the various inorganic catalysts that we have mentioned, it is interesting to note that most of the metallic elements of series V of the periodic system are catalytically active although both titanium oxide and vanadium pentoxide are possessed of but a slight activity.

Of the various elements that we have listed we believe that the oxides and hydroxides, preferably the former, of the elements, magnesium, zinc, iron, and copper are the most effective and generally useful catalysts. In many instances best results are procured by utilizing a mixture of catalysts, e. g. MgO and ZnO; MgO and $Fe_2O_3$; MgO, ZnO, $Fe_2O_3$ and CuO; etc.

There are few, if any, organic materials that function in a strictly catalytic capacity. Virtually all organic compounds that exert any measurable effect upon the speed of cure are of a reactive nature and are capable of entering into a ready reaction with the saturated halogenation products of the aldehydes of the mono hetero atomic five membered rings and their reactive derivatives as curing agents. Organic "catalysts" are probably more properly referred to as "organic aids." Organic aids may be divided into two classes. First, those that are possessed of a basic character, usually attributable to nitrogen atoms within the molecules and second, those of a highly reactive and unsaturated character which contain functionally reactive atomic groups. In the first category are included such materials as the organic amines and organic bases. The second category includes materials such as the aldehydes of the mono hetero atomic five membered rings of their corresponding alcohols, e. g., fufural and furfuryl alcohol. Catalytic aids of the first type usually function by virtue of their alkalinity in that they act as acid acceptors or by reaction with the curing agent generate activation energies that augment the rate of cure. Organic aids of the second class probably function primarily by virtue of the energy liberated upon their reaction—e. g., furfuryl alcohol usually reacts very violently with liberation of considerable heat.

The inorganic catalysts, particularly the oxides of magnesium, zinc, iron, and copper, are far more potent in their catalytic action than the organic aids.

The quantity of catalyst, if any, to be included in the compositions of the present invention is governed by a variety of factors, the principal of which are (1) the speed of cure sought, (2) the power or strength of the curing agent employed, (3) the nature of the curable polymeric material, (4) the temperature utilized in effecting the cure, (5) the type and quantity (if any) of fillers, plasticizers, and softeners present in the composition, (6) the potency of the catalyst in question, (7) the particle size of the catalyst, (8) the thoroughness with which the ingredients are mixed, (9) the presence or absence of poisons, catalytic or otherwise. Where a catalyst is to be used, we usually recommend the use of between one and twenty per cent on the weight of the polymeric material to be cured. On the other hand it should be pointed out that many of the curing catalysts, particularly zinc oxide and iron oxide, can function as fillers and, therefore, these materials may be utilized in special instances in very large quantities in which capacity they function both as catalyst and as filler. Broadly speaking there is no limitation as to the quantity of catalyst that may be used. The illustrative examples given below are indicative of recommended practices. In some instances catalysts exert untoward effects (e. g., when copper oxide is used as a catalyst and the composition is heat cured in common steel molds, there is a tendency for "copper plating" to occur).

In accordance with the teachings of the present invention, potentially reactive curable compositions may be prepared by mixing together any material for which a curing agent selected from the class comprising the saturated halogenation products of the aldehydes of the mono hetero atomic five membered rings and their reactive derivatives can be prepared with the aforesaid curing agent. The applicants have been able to prepare curing agents selected from the class comprising the saturated halogenation products of the aldehydes of the mono hetero atomic five membered rings and their reactive derivatives, which are preeminently suited for the curing of the products listed in the following list:

Curing agents for phenol-alcohols; curing agents for phenol-formaldehyde resins; curing agents for phenol-furfural resins; curing agents for acetone-formaldehyde resins; curing agents for cashew nut shell resins; curing agents for urea resins; curing agents for thiourea resins; curing agents for melamine resins; curing agents for furfur-acetone resins; curing agents for aldehyde resins; curing agents for aldehyde-amine resins; curing agents for guanidine resins; curing agents for urethan resins; curing agents for curable ethylene oxide resins; curing agents for curable olefine resins; curing agents for curable petroleum resins; curing agents for curable alkyd resins; curing agents for curable coumarone and indene resins; curing agents for curable drying oil resins; curing agents for curable polystyrols; curing agents for curable acrylate resins; curing agents for curable methacrylate resins; curing agents for curable acrylonitrile resins; curing agents for curable polyvinyl ethers; curing agents for curable polyvinyl esters; curing agents for curable polyvinyl chloride; curing agents for polyvinyl alcohols; curing agents for animal glues, water dispersible type; curing agents for animal glues, water soluble type; curing agents for casein; curing or tanning agent for proteins and albuminous material; tanning agent for leather; curing agents for shellac; curing agents for fibrous silks; curing agents for silk solutions; curing agent for wool solutions; curing agents for nylon plastics; curing agents for nylon threads; curing agents for nylon in solution form; curing agents for cellulose; curing agents for cellulose acetate; curing agents for cellulose propionate; curing agents for cellulose butyrate; curing agents for cellulose acetate propionate; curing agents for cellulose acetate butyrate; curing agents for cellulose acetate nitrate; curing agents for cellulose benzoate; curing agents for cellulose nitrate; curing agents for methyl cellulose; curing agents for ethyl cellulose; curing agents for propyl cellulose; curing agents for butyl cellulose; curing agents for benzyl cellulose; vulcanizing agents for butadieneacrylonitrile copolymer rubber; vulcanizing agents for curable butadiene-styrene copolymer rubber; vulcanizing agents for curable natural rubber derivatives; vulcanizing agents for curable butyl rubber; vulcanizing agents for polyisobutylene; curing agents for curable butene-olefine copolymer rubbers; and resinous curing agents derived from chlorinated furfural; curing agents, general purpose; curing agents, water dispersible; curing agents, water soluble; curing agents for polyvinyl acetals; and curing agents for curable polyvinylidene resins.

The following examples are cited to illustrate the production of the potentially reactive compositions of the present invention. The examples are merely demonstrative and are not in any way to be considered as exhaustive.

In the interest of simplicity we shall consider first the potentially reactive compositions derived from a single resinous entity or its progenitor. For this purpose we have selected as typical the furfuracetone condensation products. By way of explanation, it may be stated that furfuracetone condensation products may be produced by reacting together furfural and acetone in substantially molecular proportions under conditions of controlled alkalinity. The furfuracetone is then condensed by reacting it under alkaline conditions at elevated temperatures. If toward the end of the operation the alkalinity be neutralized, then one ends up with a liquid condensation product. On the other hand if the conditions of alkalinity are maintained then an exothermic reaction sets in towards the close of the operation and a grindably hard resinous product results. Products intermediate to the thinly fluid condensation product and the grindably hard product may be procured by mixing the two materials in any desired proportion.

We describe below a variety of potentially reactive combinations comprising the afore alluded to furfuracetone condensation products and a curing agent selected from the class of the fully saturated halogenation products of the aldehydes of the mono hetero atomic five membered rings on their reactive derivatives.

*Example 1a.*—As co-agent a grindably hard furfuracetone resin (22 parts) is melted and mixed with an active curing agent (3.3 parts) prepared by reacting chlorinated furfural with an excess of methanol.

*Example 1b.*—Similar to Example 1a but utilizing the curing agent produced by reacting chlorinated furfural with secondary amyl alcohol.

*Example 1c.*—Similar to Example 1a but utilizing as curing agent the reaction product procured by reacting chlorinated furfural with tetradecanol.

*Example 1d.*—Similar to Example 1a but utilizing as curing agent the reaction product procured by reacting chlorinated furfural with the mono methyl ether of ethylene glycol.

*Example 1e.*—Similar to Example 1a but utilizing as curing agent the reaction product procured by reacting chlorinated furfural with methanol in the presence of zinc dust.

*Example 1f.*—Similar to Example 1a but utilizing as curing agent the distillate procured in distilling the methanol reaction product of chlorinated furfural.

*Example 1g.*—Similar to Example 1a but utilizing as curing agent the reaction product obtained by partially distilling off chlorinated furfural in the presence of xylene.

*Example 1h.*—Similar to Example 1a but utilizing as curing agent the reaction product procured by reacting the methanol reaction product of chlorinated furfural with further quantities of methanol.

*Example 1j.*—Similar to Example 1a but utilizing as curing agent the reaction product procured by subjecting chlorinated furfural first to partially controlled distillation and then subsequently reacting it with methanol.

*Example 1k.*—Similar to Example 1a but utilizing as curing agent the straight, unmodified chlorinated furfural.

The products of the foregoing illustrative examples constitute potentially reactive compositions that are capable of being converted to an infusible and insoluble cured state. The products may be converted into the cured state either by permitting them to stand for very long periods of time at room temperatures or they may be much more rapidly cured by subjecting them to elevated temperatures. At any given temperature it is possible to speed up or slow up the rate of cure through the use of appropriate catalysts. It has been found that the rate of cure depends upon the temperature, type of curing agent used, quantity of curing agent used, type of catalyst used, quantity of catalysts used, the concentration, the presence of fillers, the presence of miscellaneous materials such as solvents, plasticizers, etc. Also of importance is the "age" of the potentially reactive composition. As a rule more satisfactory cured products result when the compositions are permitted to mellow or age at room temperature prior to being subjected to cure at elevated temperatures.

The data presented in Table I illustrates the effect of catalysts upon the compositions of the foregoing examples.

TABLE I

| Product of Example | No catalyst | Red Iron Oxide, 1.40 pts. | Magnesia (Light), 0.362 pt. | Zinc Oxide, 0.73 pt. | Cupric Oxide, 0.714 pt. |
|---|---|---|---|---|---|
| | Mins. | Mins. | Mins. | Mins. | Mins. |
| 1a | 11–32 | 2 – 9½ | 27 –50 | 3 –11 | 3–11 |
| 1b | 13–30 | 1 – 2 | 22 –37 | 1 – 2 | 3–18 |
| 1c | 20–28 | 1½– 3 | 10 –41 | 1½– 5 | 7–40 |
| 1d | 18–35 | 2 – 4 | 17 –65 | 2½– 7 | 7–42 |
| 1e | 12–32 | 1 – 3 | 21 –65 | 4 – 7 | 4–20 |
| 1f | 7–17 | 1 – 3 | 9 –60 | 2 – 4 | 3–31 |
| 1g | 14–27 | 1 – 3 | 11 –26 | ½– 2 | 3–30 |
| 1h | 15–40 | 4½–14 | 17 –41 | 6½–17 | 12–33 |
| 1j | 12–28 | 2 – 4 | 9 –31 | 3 – 7 | 6–30 |
| 1k | 6–22 | ½– 1¾ | 3½–11 | ¼– 1 | 4–24 |

| Product of Example | Antimony Oxide, 2.61 pts. | Calcium Oxide, 0.51 pt. | Iron Oxide (Black), 2.07 pts. | Iron Powder, 0.50 pt. | Zinc Powder, 0.63 pt. |
|---|---|---|---|---|---|
| | Mins. | Mins. | Mins. | Mins. | Mins. |
| 1a | 35– 60 | 24 –45 | 3 –41 | 7 –32 | 1½– 8 |
| 1b | 18– 43 | 20 –47 | 2 –16 | 12 –18 | ¾ – 1½ |
| 1c | 16– 50 | 13 –47 | 5 –48 | 6½–24 | 1½–13 |
| 1d | 30– 85 | 16 –60 | 10 –42 | 11 –35 | 2½– 9 |
| 1e | 22– 60 | 18 –65 | 8 –25 | 4 –32 | 2 – 8¼ |
| 1f | 15– 53 | 14 –55 | 4 –30 | 6 –15 | ¾ – 5 |
| 1g | 6– 15 | 11 –30 | 4 –10 | 5 –26 | ¾–  ¾ |
| 1h | 33–105 | 20 –53 | 11 –33 | 19 –58 | 13 –30 |
| 1j | 24– 42 | 14 –28 | 4½–19 | 10 –37 | 5 –12 |
| 1k | 3– 8 | 5½–16 | ⅔– 9 | 3 –23 | ¼– 1½ |

| Product of Example | Iron Oxide (Brown), 0.96 pt. | Ferric Hydroxide (Dried out) 0.96 pt. | Cobalt Oxide, 1.49 pts. | Cupric Hydroxide, 0.86 pt. | Chromium Oxide, 0.60 pt. |
|---|---|---|---|---|---|
| | Mins. | Mins. | Mins. | Mins. | Mins. |
| 1a | 2½–17 | 1¾– 2½ | 6½–31 | 7 –17 | 11 –60 |
| 1b | 1½– 5 | 1¼–25 | 5½–25 | 4 –15 | 9½–47 |
| 1c | 2½–15 | 2 – 3 | 6 –36 | 5 –15 | 15 –60 |
| 1d | 6 –45 | 2½– 5 | 8 –23 | 9 –21 | 17 –59 |
| 1e | 3 –14 | 2 – 3 | 7 –29 | 9 –19 | 13 –56 |
| 1f | 1½– 5 | 1 – 2 | 4 –25 | 10 –20 | 6 –40 |
| 1g | 1 – 5 | ½– ¾ | 3 –24 | 2½–11 | 11 –34 |
| 1h | 11 –45 | 5 –14 | 8 –37 | 12 –35 | 34 –65 |
| 1j | 3 – 8 | 3 – 3½ | 11 –45 | 6 –10 | 13 –52 |
| 1k | ¾–14 | ¼– ¾ | 1½–14 | 1 – 5 | 7 –34 |

TABLE I—CONTINUED

| Product of Example | Catalyst 18432-A, 1 pt. | Catalyst 18432-B, 1 pt. | Catalyst 18432-C, 1 pt. | Catalyst 18432-D, 1 pt. | Catalyst 18432-E, 1 pt. |
|---|---|---|---|---|---|
| | Mins. | Mins. | Mins. | Mins. | Mins. |
| 1a | 1¼- 4½ | 2 -17 | 1½- 4½ | 3 -13 | 1¼- 2½ |
| 1b | ¾- 1½ | 1¾-27 | 1.15-10 | 2½-11 | 0.57-1.5 |
| 1c | 1¼- 3½ | 1¾-31 | 1½-20 | 3½-35 | 1¼-2½ |
| 1d | 1½- 3½ | 2½-35 | 2 -25 | 2½-23 | 1¾- 3¾ |
| 1e | 1 - 2½ | 1¾-18 | 1¼- 8 | 2½-22 | 1¾- 2½ |
| 1f | 1 - 2½ | 1¼-16 | 1 - 4½ | 1½- 5 | ¾- 1½ |
| 1g | ¾- ¾ | 1½-15 | ¾-10 | 1½-20 | ½- 1½ |
| 1h | 5½-15 | 4 -32 | 10 -22 | 6½-30 | 5 -15 |
| 1j | 1 - 2½ | 3 -28 | 3 -17 | 2¼-16 | 1¼- 2½ |
| 1k | 0.12-0.42 | 3½-12 | ½-12 | 1¼-10 | 0.17-0.50 |

| Product of Example | Catalyst 18438-A, 1.05 pts. | Catalyst 18438-B, 1.28 pts. | Catalyst 18438-C, 1.28 pts. | Catalyst 18438-D, 1.28 pts. | Catalyst 18438-E, 1.25 pts. |
|---|---|---|---|---|---|
| | Mins. | Mins. | Mins. | Mins. | Mins. |
| 1a | 1¾- 5 | 1½- 6 | 1 - 5 | 1.30-16.0 | 1½- 3 |
| 1b | 1¼- 4 | 1 -14 | ¾- 2½ | 1¼- 9 | ¾- 2 |
| 1c | 1½- 6½ | 1½-20 | 1.17-7.0 | 1½-16 | 1¼- 5 |
| 1d | 1¼- 9 | 1½-15 | 1¼- 4 | 1½-10 | 1½- 5 |
| 1e | 1¾- 6 | 1 -13 | 1¼- 6 | 1.7-12.0 | 1¾- 4 |
| 1f | 1.17-5.0 | 1 -10 | 1 - 2 | ¾- 5 | 1 - 2½ |
| 1g | ½- 1½ | ¾-11 | ½- 4 | 1¼-12 | ¾- 1¼ |
| 1h | 5 -15 | 4 -15 | 4 -15 | 5 -22 | 5 -15 |
| j | 1½- 6 | 1 - 5 | 1¼- 7 | 1½-15 | 1.7-3.0 |
| 1k | 0.33-0.50 | 0.67-4.0 | ¼- 1 | ½-10 | ¾- ¾ |

The quantity of catalyst is indicated in terms of parts used per 14.17 parts of potentially reactive composition. The times as listed in the table denote the time in minutes required for the composition to cure, as determined by smear tests carried out upon a steel hotplate maintained at approximately 310° F. The smaller figure to the left denotes the time required to convert the product to the point of incipient infusibility, while larger figure to the right denotes the time required to convert the product to a hard and brittle state.

Catalysts Nos. 18432-A, B, C, D and E, as well as catalysts Nos. 18438-A, B, C, D and E were prepared by mixing together solutions of ferric chloride and zinc chloride in the proportions indicated below and then precipitating via the addition of calculated quantities of a one normal solution of sodium hydroxide. The precipitates were sucked damp-dry upon a suction funnel and dried at a low temperature.

Utilizing the data contained in Table I as a basis, we present in Table II a comparison of the reactivities of the various curing agents used in preparation of the products of Examples 1a to 1k.

TABLE II

| Potentially Reactive Compositions Per Example | "Overall Summarized" Cure Time | Average Cure Time Using the 10 Most Effective Catalysts | Average Cure Time Using the 5 Most Effective Catalysts |
|---|---|---|---|
| | Mins. | Mins. | Mins. |
| 1a | 6.27 -19.8 | 1.65 - 5.70 | 1.44 - 3.13 |
| 1b | 4.715-15.05 | 0.907- 3.35 | 0.83- 1.88 |
| 1c | 4.52 -22.7 | 1.44 - 6.85 | 1.44 - 3.50 |
| 1d | 6.56 -26.5 | 1.825- 6.525 | 1.81- 4.31 |
| 1e | 5.58 -20.08 | 1.75 - 5.55 | 1.63- 3.00 |
| 1f | 3.65 -15.90 | 1.067- 3.75 | 0.94- 2.13 |
| 1g | 2.83 -12.25 | 0.555- 2.65 | 0.50- 1.06 |
| 1h | 10.84 -32.18 | 5.75 -16.50 | 5.13-14.75 |
| 1j | 5.45 -16.50 | 2.07 - 5.25 | 1.74- 2.88 |
| 1k | 1.615- 8.90 | 0.312- 1.207 | 0.20- 0.61 |

The above data reveals that the 5 most active of the potentially reactive compositions used fall in the following order: 1k (most active), 1g, 1b, 1f and 1j (least active of the 5). Table II also discloses the relative order of reactivity possessed by the potentially reactive compositions independently of the type of catalyst.

Table III shows the relative activity of the 24 catalysts referred to in Table I, independent of the type of curing agent used.

TABLE III

| Catalyst | Total Cure Time Using Compositions 1a to 1k | Average Cure Time Using the 5 Most Active Compositions 1k, 1g, 1b, 1f, 1j |
|---|---|---|
| | Mins. | Mins. |
| Red Iron Oxide | 16.5 - 47.25 | 1.10- 2.75 |
| Magnesia (Light) | 146.5 -457.0 | 10.90-33.00 |
| Zinc Oxide | 24.25- 62.9 | 1.35- 3.18 |
| Cupric Oxide | 52.0 -279.0 | 3.80-26.60 |
| Antimony Oxide | 202.0 -521.0 | 13.2 -32.20 |
| Calcium Oxide | 155.50-446.0 | 12.9 -35.20 |
| Iron Oxide (Black) | 52.2 -276.0 | 3.03-16.80 |
| Iron Powder | 83.5 -300.0 | 7.20-23.80 |
| Zinc Powder | 27.6 - 89.25 | 1.43- 4.15 |
| Iron Oxide (Brown) | 32.75-173.0 | 1.55- 7.40 |
| Ferric Hydroxide (Dried out) | 19.25- 37.0 | 1.20- 1.90 |
| Cobalt Oxide | 60.5 -289.0 | 5.00-26.60 |
| Cupric Hydroxide | 73.50- 18.00 | 4.70-12.20 |
| Chromium Oxide | 161.50-514.00 | 9.30-41.40 |
| 18432-A | 15.12- 38.92 | 0.62- 1.53 |
| 18432-B | 26.25-257.00 | 2.20-19.60 |
| 18432-C | 28.65-151.00 | 1.28-10.70 |
| 18432-D | 30.50-200.00 | 1.80-12.40 |
| 18432-E | 15.49- 35.50 | 0.65- 1.50 |
| 18438-A | 18.00- 65.50 | 0.95- 3.40 |
| 18438-B | 15.42-123.00 | 0.88- 8.80 |
| 18438-C | 15.42- 63.50 | 0.75- 3.30 |
| 18438-D | 17.75-137.00 | 1.05-10.20 |
| 18438-E | 17.45- 45.50 | 0.89- 1.90 |

The above table discloses that of the 24 catalysts used, the 10 most active are (listed in the order of decreasing activity): No. 18432-E; No. 18432-A; No. 18438-E; ferric hydroxide (dried out); iron oxide, red; zinc oxide; No. 18438-C; No. 18438-A; Zinc dust; 18438-B.

In Table IV are presented the cure times procured when utilizing the five most active of the potentially reactive compositions and the three most potent catalysts.

TABLE IV

| Potentially Reactive Compositions per example | Catalyst 18432-A | Catalyst 18432-E | Catalyst 18438-E |
|---|---|---|---|
| | Mins. | Mins. | Mins. |
| 1b | 0.68-1.25 | 0.70-1.75 | 0.75-1.87 |
| 1f | 0.92-1.67 | 0.75-1.75 | 1.00-2.25 |
| 1g | 0.25-0.67 | 0.43-1.50 | 0.52-0.90 |
| 1j | 1.12-2.5 | 1.29-1.75 | 1.7 -3.05 |
| 1k | 0.18-0.43 | 0.20-0.67 | 0.24-0.75 |

The applicants have found that in the instance of furfuracetone condensation products zinc oxide (probably admixed with more or less zinc hydroxide) prepared at low temperatures is one of the most effective catalysts. For this purpose 5.10 ounces of zinc chloride are dissolved in water and the volume made up to one liter. A NaOH solution is prepared by dissolving 1.48 ounces of sodium hydroxide in water and making the volume up to one liter. Sodium hydroxide solution, in quantities sufficient to react with the chloride ions, is added to the zinc chloride solution. The precipitate is allowed to settle and then transferred to a suction filter and washed. The washed precipitate is sucked to a damp-dry condition on a filter and is then broken up and dried at a temperature of between 200° F. and 215° F. under a 25 inch vacuum. The dried product is broken up and finely ground. For convenience the above catalyst is referred to as No. 23510.

Table V illustrates the effect of varying the quantity of catalyst when using the five most active of the potentially reactive compositions.

TABLE V

| Catalyst No. 23,510, Parts per 14.17 pts. of composition | Potentially Reactive Compositions | | | | |
|---|---|---|---|---|---|
| | 1b | 1f | 1g | 1j | 1k |
| | Mins. | Mins. | Mins. | Mins. | Mins. |
| 0.1 | 4½ | 3 | 3¼ | 7¼ | 4½ |
| 0.2 | 2¼ | 2 | 1¼ | 3½ | 1½ |
| 0.35 | 1¾ | 1¾ | ¾ | 2½ | ⅚ |
| 0.50 | 1¾ | 1½ | ⅔ | 2¾ | ¼ |
| 1.0 | 1¾ | 2 | ⅚ | 3 | 7/12 |
| 2.0 | 1¾ | 2¼ | 1 | 3 | 55 |

The times indicated denote the time required to cure the potentially reactive mixtures to the point of brittle hardness, as determined by smear tests carried out upon a steel hotplate maintained at 310° F.

The above table discloses the interesting fact that as the quantity of catalyst is increased the speed of cure is likewise increased. Beyond a certain point, however, increasing the quantity of catalyst tends to slow the reaction. It appears that there is a certain optimum quantity of catalyst for each specific potentially reactive composition. In the instance at hand it appears that the use of 0.50 part of catalyst 23510 per 14.17 pts. of composition yields the fastest cures.

Many organic compounds, particularly those of an acidic character, function as effective catalysts or co-agents. The data presented in Table VI is representative of the effect of such compounds upon potentially reactive compositions consisting of furfuracetone condensation products as co-agent and fully saturated halogenation products of the aldehydes of the mono hetero atomic five membered rings or their active derivatives as curing agent.

TABLE VI

| Agent | Remarks |
|---|---|
| maleic acid | speeds up cure. |
| phthalic acid | Do. |
| benzine-sulfonic acid | markedly speeds up cure. |
| meta-benzine disulfonic acid | Do. |
| sulfanilic acid | speeds up cure. |
| chromotropic acid | Do. |
| dichloro-succinic acid | markedly speeds up cure. |
| tartaric acid | slight effect. |
| p-toluene sulphonyl chloride | speeds up cure. |
| benzo-trichloride | speeds up cure; also good solvent. |
| a-hydroxy-iso-butyric acid | little effect. |
| methylene dianilid | markedly slows up cure. |
| aniline | Do. |
| a-nitro-napthalene | little effect but good solvent. |
| maleic anhydride | speeds up cure. |
| succinic anhydride | Do. |

As exemplified by the above tabular data we have considered a constant ratio by weight of active curing agents to the quantity of furfuracetone condensation product. We wish to emphasize that the ultimate properties of a potentially reactive composition are markedly influenced by the ratio of active curing agent to its co-agent. The results listed in Table VII may be considered as representative.

TABLE VII

| Composition Number | Furfuracetone condensation product | Curing Agent No. 17,792 | Condition after standing 24 hours at room temperature |
|---|---|---|---|
| | Pts. | Pts. | |
| 29836-A | 8 | 16 | firm, tough gel. |
| 29836-B | 8 | 12 | similar to "A" but slightly softer. |
| 29836-C | 8 | 8 | similar to "F" but wetter. |
| 29836-D | 8 | 6 | pasty—wet type of gel, softest of the lot. |
| 29836-E | 8 | 20 | slightly softer than "B." |
| 29836-F | 8 | 24 | slightly softer than "E" but drier. |
| 29836-G | 8 | 32 | softer than "F" and "dry." |

Curing agent No. 17792, referred to in the above table, designates the product resulting from the inter-action of methanol (in excess) with chlorinated furfural.

Table VII discloses the interesting fact that if we keep the quantity of furfuracetone condensation product constant (8 ounces) then the most active composition results when we use 16 parts of curing agent. When the quantity of curing agent is either increased or decreased beyond this point the rate of cure, as determined by the firmness of the resultant irreversible gel, diminishes. It is to be noted that whereas the product of examples 1a to 1k contain but 15% of curing agent on the weight of furfuracetone condensation product, the products of Table VII contain anywhere from 75% to 400% of curing agent on the weight of furfuracetone condensation product.

As little as one tenth of one percent of curing agent oftentimes manifests its presence by exerting a measurable effect upon the composition. It is significant that in many instances the curing agents around which the present invention centers can be utilized in proportions from as low as one tenth of one percent to as high as several hundred percent to yield compositions of industrial interest.

A very significant point disclosed in the above tables resides in the fact that the ratio of time required to reach incipient infusibility to the time required to reach the point of brittle hardness can be varied over rather wide limits. It would appear from this that through the proper selection of the quantity and type of curing agent, as well as the quantity and type of catalyst, it should be possible to obtain any desired or predetermined "cure curve" (i. e., state of cure versus time). The cure curve plays a very significant role in the manufacture of coating compositions, molding compositions, etc.

Not infrequently fillers exert a profound effect upon the potentially reactive compositions of the present invention. It is found that some fillers tend to speed up the rate of cure, whereas others slow it down. Some fillers tend toward the production of compositions that are porous whereas others yield dense and substantially non-porous products. The data presented in Table VIII is typical.

In preparing the mixtures to which the filler was added, 100 parts of liquid furfuracetone condensate were mixed with 150 parts of curing agent No. 17792 along with five parts of commercial zinc oxide. The mixtures were ballmilled for a period of not less than 3 hours. Filler was added in the proportion of $$1 \times \frac{\text{sp. grav.}}{1.80}$$

parts of filler to 3 parts of the above mixture so as to maintain the volume percentage of filler constant.

TABLE VIII

| Number of Mix | Filler | Cured in 140° F. oven | | | Cured in 200° F. oven | | |
|---|---|---|---|---|---|---|---|
| | | Time Cured, Days | Porosity No. | Hardness | Time Cured, Hours | Porosity No. | Hardness |
| 29,704-A | hydrated alumina | 3 | 7 | H | 2¼ | 6 | H+ |
| 29,704-B | processed clay | 2 | 4 | H+ | ½ | 6 | H+ |
| 29,704-C | hard carbon black | 2 | 10 | H | 1¼ | 8 | H+ |
| 29,704-D | red iron oxide | 1 | 4 | Sl | ½ | 10 | H+ |
| 29,704-E | walnut shell flour | 4 | 2 | SlS | 2½ | 10 | H+ |
| 29,704-F | Novolak resin | 4 | 2 | H | 2½ | 10 | H+ |
| 29,704-G | asbestos flour | 5 | 9 | VS | 5 | 8 | H+ |
| 29,704-H | urea formaldehyde condensate | 4 | 8 | H | 2½ | 8 | H+ |
| 29,704-J | titanium dioxide | 1 | 2 | H+ | 2½ | 4 | H+ |
| 29,704-K | calcium carbonate | 8 | | | 6 | 6 | stiff paste |
| 29,704-L | soft carbon black | 3 | 6½ | H | 6 | 10 | H+ |
| 29,704-M | very soft carbon black | 3 | 4 | H+ | 1¼ | 6 | H+ |

The porosity numbers referred to in the above tables are merely a rough comparative index. The number "10" represents a very porous product, whereas the number "1" represents a very slightly porous product. Intermediate degrees of porosity have been given intermediate numbers. The porosity numbers in the vertical columns are comparative, but the porosity numbers between the 140° F. cured product and the 200° F. cured product should not be directly compared as they are each upon a separate basis of comparison. The hardness abbreviations have the following significance: "H"=hard; "H+"=hard plus; "S"=soft; "Sl"=slight; "V"=very. It appears that processed clay, titanium dioxide and hard carbon black are among the fillers most inclined to augment the cured hardness. On the other hand, asbestos flour and calcium carbonate act as cure inhibitors.

The present applicants have found that in instances where a filler such as asbestos flour tends to slow up or prevent a ready thorough cure, this inhibition can oftentimes be offset by incorporating into the composition appropriate quantities of highly active catalysts, including materials such as benzo-trichloride, e. g. to 3 parts of a composition comprising 100 parts of a viscous furfuracetone condensation product and 150 parts of curing agent No. 17792 there is added 0.2 part of zinc oxide, 0.2 part of benzo-trichloride and 3 parts of asbestos flour—the resultant composition reacts and sets up to a porous infusible mass on standing overnight at room temperature, or at 140° F. it sets up in 60 minutes. The same composition, but minus the asbestos, set up after 4 hours at room temperature or after 15 minutes at 140° F.

Products of considerable commercial utility can be prepared in the following manner. A base stock (No. 31752) is prepared by mixing 150 parts of curing agent No. 17792 with 105 parts of composition No. 31750. Composition No. 31750 is prepared by ball milling a mixture comprising 75 parts of a liquid furfuracetone condensation product and 25 parts of a solid furfuracetone condensation product with 5 parts of commercial zinc oxide. The base stock is then mixed with suitable fillers as is indicated in Table IX.

TABLE IX

| Composition No. 31,758 | Base Stock No. 31,752 | Cured Urea Formaldehyde Resins. Dry Powder | Processed Clay | Titanium Dioxide |
|---|---|---|---|---|
| -D | 3.0 | 0.3 | 1.0 | 0 |
| -E | 3.0 | 0.3 | 1.4 | 0 |
| -K | 3.0 | 0.3 | 0 | 2.2 |
| -N | 3.0 | 0.3 | 0.4 | 0.5 |

Products formulated as per above are conveniently cured at temperatures in the neighborhood of 140° F. For the best results and in order to assure a minimum porosity it is recommended to cure under pressure or alternatively to age or mellow the compositions by letting them stand for 4 or more days at room temperature prior to the application of higher temperatures.

We have thus far considered only the use of curing agents derived from the saturated chlorination products of furfural and the active derivatives procurable therefrom. The applicants wish to stress, however, that homologues and analogues of furfural can also serve as the base of the curing agents. Furthermore, in addition to chlorination products one may utilize halogenation products containing the elements iodine, bromine or fluorine. The examples that follow clearly demonstrate these aspects.

*Example 2a.*—One hundred parts of a mixture comprising solid and liquid condensation products of furfuracetone are admixed with 5 parts of zinc oxide and 20 parts of the saturated chlorination product of a-methyl furfural as curing agent. The above potentially reactive composition may readily be cured upon the application of heat.

*Example 2b.*—One hundred parts of a mixture comprising solid and liquid condensation products of furfuracetone are admixed with 5 parts of zinc oxide and 20 parts saturated chlorination product of a-ethyl furfural as curing agent. The above potentially reactive composition may readily be cured upon the application of heat.

*Example 2c.*—One hundred parts of a mixture comprising solid and liquid condensation products of furfuracetone are admixed with 5 parts of zinc oxide and 20 parts of a curing agent prepared by adding the equivalent of two atoms of iodine dissolved in carbon tetrachloride to a solution of furfural in carbon tetrachloride and, after reaction, passing in chlorine until the compound is fully saturated and then isolating the same by distilling off the volatile solvents. The above potentially reactive composition may readily be cured upon the application of heat.

*Example 2ca.*—In the foregoing example the halogen element iodine was directly introduced into the heterocyclic nucleus of the five membered ring. It is also possible to introduce iodine into the complex by indirect means, e. g., the saturated chlorination product of furfural is heated with potassium iodide (in a proportion such that the number of iodine atoms correspond to about one fourth the number of the chlorine atoms in the compound) in the presence of xylene. One may then mix together 100 parts of a mixture comprising solid and liquid condensation products of furfuracetone, 5 parts of zinc oxide and 20 parts of the afore-described iodine containing curing agent. The above potentially reactive composition may readily be cured upon the application of heat.

*Example 2cb.*—In a somewhat analogous manner it is possible to introduce a wide variety of any of the known chemical elements. For example, by heating the saturated chlorination products of furfural with anhydrous sodium sulphide in the presence of methanol one procures a reactive sulphur containing derivative which can function as curing agent. The aforesaid sulphur-containing curing agent may be substituted for the curing agent of any of the foregoing examples.

*Example 2d.*—One hundred parts of a mixture comprising solid and liquid condensation products of furfuracetone are admixed with 5 parts of zinc oxide and 20 parts of a curing agent prepared by adding the equivalent of two atoms of bromine dissolved in chloroform to a solution of furfural dissolved in carbon tetrachloride and after reaction passing in chlorine until the compound has become saturated and then isolating the said compound by distilling off the volatiles. The above potentially reactive composition may readily be cured upon the application of heat.

*Example 2e.*—One hundred parts of a mixture comprising solid and liquid condensation products of furfuracetone are admixed with 5 parts of zinc oxide and 20 parts of a curing agent prepared by passing the equivalent of two atoms of fluorine (prepared electrically from hydrogen fluoride in the presence of potassium fluoride) into a solution of furfural dissolved in dichlorodifluoro-methane and then passing in chlorine until the compound has become saturated, followed by the isolation of the compound by distilling off the volatiles. The above potentially reactive composition may readily be cured upon the application of heat.

*Example 2f.*—One hundred parts of a mixture comprising solid and liquid condensation products of furfuracetone are admixed with 5 parts parts of zinc oxide and 20 parts of the saturated chlorination product of a-thiophen aldehyde (the latter may be obtained from thienylglyoxylic acid). The above potentially reactive composition may readily be cured upon the application of heat.

*Example 2g.*—100 parts of a mixture comprising the solid and liquid condensation products of furfuracetone are admixed with 5 parts of zinc oxide and 20 parts of the saturated chlorination product of a-pyrrole aldehyde (the latter may be obtained through the reaction of chloroform and potassium hydroxide upon pyrrole). The holagenation products of the pyrrole aldehydes are perhaps structurally different from those derived from the aldehydes of furane and thiophen. These differences are probably attributable to the presence of the imine hydrogen in the nucleus and unusual reactivity of the methine hydrogen. However, for the purposes of the present invention the saturated halogenation products of the aldehydes of pyrrole may be looked upon as equivalents for the saturated halogenation product of furfural inasmuch as they, too, possess the unique functional attribute of being able to bring about the cure of various substances. The above potentially reactive composition may readily be cured upon the application of heat.

While on the subject of furfuracetone products, the applicants wish to point out that the reactivity or speed of cure of the furfuracetone condensation products appears to be related to the molecular weight of the same. Thus, the thinly fluid non-resinous products are the slowest curing. On the other hand the solid resinous products cure much more rapidly. The higher the molecular weight (which appears to go hand in hand with the fusion point) the more rapid the cure. From the practical standpoint it is oftentimes difficult to mix the reactive curing agents with a solid condensation product, particularly if it be possessed of a high melting point, because the temperature required to fuse the same is too close to the critical temperature at which the mass will spontaneously set up and cure. For this reason it is usually desirable to utilize furfuracetone condensation products in liquid form so as to permit the more ready incorporation of the reactive curing agent (which latter are preferably in liquid form). It so happens that it is much easier to prepare either the non-resinous thinly liquid furfuracetone product or the solid furfuracetone product. It is advantageous to mix thinly fluid furfuracetone condensation products with solid furfuracetone condensation products so as to procure mixtures of good working properties. In this manner it is possible to secure an added measure of control over the reactivity of the potentially reactive compositions that are produced by mixing the afore co-agents with active curing agents.

An almost endless variety of modifications may be effected by including in any of the products of the above examples other materials specifically selected to impart special attributes to the ultimate composition. Thus one may incorporate other resins of a type which may or may not be susceptible to cure via the saturated halogenation products of the aldehydes of the mono hetero atomic five membered rings or their reactive derivatives. Similarly one may incorporate plasticizers, particularly those of the ester type, including alkyd resinous plasticizers. Plasticizers comprising chlorinated products such as chlorinated biphenyls are useful. Materials such as cashew nut shell liquid, its condensation products and its various derivatives are extremely useful in this connection. Rubbery materials, particularly the butadiene-acrylonitrile copolymer rubbers, have been found to be extremely compatible. While fibrous cellulosic fillers and asbestos fillers are not particularly recommended, there are other fibrous materials such as glass flock and glass cloth which may advantageously be utilized to produce materials of great strength.

It is interesting to note that the reactive curing agents utilized in the pursuit of the present invention are equally effective with both the non-resinous furfuracetone condensation products and the distinctly resinous solid furfuracetone condensation products. This constitutes an exceptional instance because as a general rule only polymeric substances readily lend themselves for use in the present invention.

It will be noted that the foregoing examples have been confined to the use of furfuracetone condensation products as the co-agent. We have gone into considerable lengths in portraying the production of a wide variety of potentially reactive compositions out of a single class of products. In spite of the numerous examples the data presented represents perhaps only one percent of the findings made by the present applicants in connection with furfuracetone condensation products alone. As there are many hundreds of other materials which may be used in lieu of furfuracetone condensation products, it will be impossible for the applicants in the present specifications to present data as detailed as that presented in the instance of furfuracetone condensation products. The applicants present below several dozen examples revealing the production of potentially reactive compositions out of co-agents other than the above exemplified furfuracetone condensation products.

Virtually all known cellulose derivatives are in varying degrees susceptible to cure via the saturated halogenation products of the aldehydes of the mono hetero atomic five membered rings and their reactive derivatives. The number of known cellulose derivatives runs into the hundreds. We present below typical formulations representative of the more common and widely used of the cellulose derivatives.

*Example 3a.—*

| | Parts (dry basis) |
|---|---|
| Cellulose nitrate type SS, 5–6 sec | 100 |
| Ethyl acetate | 60 |
| Butyl acetate | 100 |
| Ethyl lactate | 40 |
| Toluene | 200 |
| Tricresyl phosphate | 40 |
| Curing agent No. 17830 | 15 |

The above solution is useful as a lacquer coating. It is recommended that it be air-dried, preferably about one hour, and then oven-dried at 100° C. and finally baked in the neighborhood of 160° C. for a period of about 45 minutes. The cellulose nitrate referred to in the above formula is manufactured by the Hercules Powder Company, Wilmington, Delaware. Curing agent No. 17830 represents a 50% solution of chlorinated furfural dissolved in carbon tetrachloride. The above formula has been designed to yield cures of in the neighborhood of 50%.

*Example 3b.—*

| | Parts |
|---|---|
| Cellulose acetate, type LH | 100 |
| Ethylene dichloride | 700 |
| Methyl alcohol | 80 |
| Ethyl lactate | 25 |
| Methyl phthyl ethyl glycollate | 35 |
| Curing agent No. 17720 | 10 |

The cellulose acetate referred to is procurable from the Hercules Powder Company of Wilmington, Delaware. Curing agent No. 17720 is produced by subjecting chlorinated furfural to partial distillation in the presence of xylene. Articles coated with the above preparation may be first air-dried at room temperature and then at elevated temperature and finally baked at about 165° C. for a period of about 45 minutes to cure the composition.

*Example 3c.—*

| | Parts |
|---|---|
| Ethyl cellulose, type medium–100 | 100 |
| Xylene | 60 |
| Butyl alcohol | 15 |
| Dow Plasticizer (di-o-xenyl-mono-phenyl-phosphate) No. 6 | 13 |
| Curing agent No. 17810 | 30 |

The ethyl cellulose and the Dow Plasticizer No. 6 referred to are manufactured by the Dow Chemical Company, Michigan. Curing agent No. 17810 is prepared by mixing chlorinated furfural which has been subjected to distillation with about ten percent of dioctyl phthalate. The above preparation may be used as a surface coating and may be cured by first airdrying at room temperature and then at elevated temperature and finally subjecting it to a bake at 160° C. for a period of about 45 minutes. Approximately 60% of the cellulose is completely insolubilized.

*Example 3d.—*

| | Parts |
|---|---|
| Cellulose acetopropionate type hercose AP-Med | 100 |
| Ethyl acetate | 200 |
| Butyl acetate | 200 |
| Ethyl lactate | 20 |
| Methyl phthyl ethyl glycollate | 25 |
| Toluene | 150 |
| Curing agent No. 17720 | 15 |

The cellulose acetopropionate referred to may be procured from the Hercules Powder Company of Wilmington, Delaware. The above preparation is designed for use in surface coating and is calculated to insolubilize approximately 60% of the cellulose derivative when cured at 165° C. for approximately 45 minutes after an appropriate period of air-drying to eliminate the ready volatiles.

*Example 3e.—*

| | Parts |
|---|---|
| Cellulose acetobutyrate #1 type EAB 381–30 | 100 |
| Acetone | 240 |
| Ethyl acetate | 120 |
| Ethyl lactate | 40 |
| Cellosolve acetate | 30 |
| Butanol | 20 |
| Toluene | 50 |
| Curing agent No. 17720 | 15 |

The cellulose acetobutyrate referred to is manufactured by the Eastman Tennessee Corporation. The above preparation is designed for use in surface coating and is calculated to insolubilize approximately 60% of the cellulose derivative when cured at 165° C. for approximately 45 minutes after an appropriate period of air-drying to eliminate the ready volatiles. In the above Examples 3a, b, c, d and e it will be noted that no catalysts were used. For many applications involving the use of the preparations for surface coatings a catalyst is unnecessary. Where, however, a speedier rate of cure is desired or where it is desirable to use less curing agent a catalyst may advantageously be employed. As a rule the incorporation of a mineral type of catalyst tends to render the composition cloudy or opaque due to its presence. The following formula is typical:

*Example 3f.—*

| | Parts |
|---|---|
| Cellulose acetate, type 103–A | 100 |
| Acetone | 160 |
| Ethylene dichloride | 240 |
| Dioxane | 640 |
| Methyl Cellosolve acetate | 320 |
| Ethyl lactate | 80 |
| Toluene | 160 |
| Methyl phthyl ethyl glycollate | 35 |
| Magnesium oxide (light) | 25 |
| Curing agent No. 17720 | 10 |

The cellulose acetate called for in the above formula is manufactured by Du Pont, Wilmington, Delaware. The above preparation is designed for use as a lacquer coating and when subjected to cure substantially 100% of the cellulose acetate is rendered completely insoluble in even the most powerful of the usual solvents for the same. Cure may be effected by subjecting films to a temperature of approximately 165° C. for a period of 45 minutes after air-drying.

Cellulose derivatives vary considerably as regards their susceptance to cure via the saturated halogenation products of the aldehydes of the mono hetero atomic five membered rings and their reactive derivatives. From a practical standpoint it is desirable to utilize only those particular derivatives that cure readily. We list below types of the more common cellulose derivatives which have been found to be particularly susceptible to cure.

TABLE X

*Cellulose acetates*

| Type | Manufacturer |
|---|---|
| A-9 | Eastman Tennessee Corp. |
| A-407 | Do. |
| Type LH-1 | Hercules Powder Co. |
| PH-1 | Do. |
| LM | Do. |
| 103-A | Du Pont de Nemours, Wilmington, Del. |

TABLE XI

*Ethyl celluloses*

| Type | Manufacturer |
|---|---|
| D-100 | Hercules Powder Co. |
| D-200 | Do. |
| K-200 | Do. |
| Med-15, Med-50 | Dow Chemical Co. |
| Med-100 | Do. |

TABLE XII

*Cellulose nitrates*

| Type | Manufacturer |
|---|---|
| RS 5-6 | Hercules Powder Co. |
| RS 20-30, RS 60-80, RS 600-1000 | Do. |
| SS 5-6, SS ½ Sec, SS ¼ Sec | Do. |
| D 22 | Do. |
| AS ½ Sec | Do. |

TABLE XIII

*Cellulose acetopropionate*

| Type | Manufacturer |
|---|---|
| AP-331-30 I | Eastman Tennessee Corp. |
| Herclose AP, Low | Hercules Powder Co. |
| Herclose AP, 34 Med | Do. |
| Herclose AP, I | Do. |

Although the above types have been ascertained as being the most suitable for use in the present invention, it should be pointed out in all fairness that there may be other types that have not been tested and it should also be emphasized that the susceptance to cure of a given type appears to vary from lot to lot.

The above examples disclosing the use of cellulose derivatives have been confined to the preparation of fluid compositions applicable for use as surface coatings, impregnants, etc. The potentially reactive compositions of the present invention are, however, equally applicable to the preparation of compositions usable for other purposes, e. g., compression molding, injection molding, extrusion, etc. The following formulation is typical:

| | Parts |
|---|---|
| Cellulose acetate, Du Pont type, 103-A | 100 |
| Methyl phthyl ethyl glycollate | 50 |
| Magnesium oxide (light) | 30 |
| Curing agent No. 22701 | 20 |

Curing agent No. 22701 comprises a mixture consisting of 50 parts of methyl phthyl ethyl glycollate and 50 parts of the reaction product procured by subjecting the saturated chlorination product of furfural to partial distillation in the presence of xylene. The ingredients called for in the above formula are conveniently mixed upon differential rolls maintained at a temperature of approximately 212° to 280° F. The curing agent should be the last item incorporated. After sheeting off the stock, it may be press cured for a period of from 30 minutes to 60 minutes at temperatures between 275° F. and 325° F. Upon completion of the cure the product may be removed from the hot mold, it being unnecessary to chill the mold prior to removal. The press cured product is characterized by great strength and toughness and is not appreciably affected by the usual solvents. The cellulose compound has now been rendered substantially infusible and is possessed of a softening point greatly in excess of that of products made without the use of the curing agent. It will be noted that in the above formula magnesium oxide is called for. Had the magnesium oxide not been used or had small quantities of zinc oxide been used, then instead of curing up to a dense, hard, strong product, the cellulose would have degenerated into a sticky and gooey putty-like mass. This degeneration is accompanied by the elimination of acetyl groups, imparting to the more or less fluid mass a strong odor of acetic acid. This type of degeneration is of interest and of commercial utility for special applications where it is desirable to utilize thermoplastic products of a putty-like consistency. Via appropriate control it is possible to procure compositions covering a wide range of consistencies and properties.

Where desired, one may incorporate into the compositions a wide variety of modifying agents, fillers, pigments, dyestuffs, plasticizers, lubricants, etc. One may also utilize a mixture of two or more cellulose derivatives. Further, it has been found that in using differential rolls to effect the mixing one may include in the formula a wide variety of products that normally are incompatible with the cellulose derivative, including resins and various types of rubbers, particularly butadiene-acrylonitrile-copolymer and various neoprene types.

The applicants wish to stress than in lieu of the above well-known cellulose derivatives one may also utilize water soluble types such as methyl cellulose; sodium carboxy methyl cellulose; etc. When using water soluble cellulose derivatives it is desirable to utilize water soluble types of curing agents. Among other cellulose derivatives which may be used, mention may be made of cellulose proprionate; cellulose butyrate; cellulose nitrate acetate; cellulose xanthate; etherification products of cellulose, e. g. benzyl cellulose and propyl cellulose; and in general the products resulting from the interaction of cellulose with alkylating agents such as alkyl halides or aryl alkyl halides in the presence of strong alkalies; hydroxy ethylcellulose; sodium chlorocellulosate; tosyl cellulose; colored ethers prepared by coupling the amino benzyl ether of cellulose with diazonium salts; sodium cellulose glycollate; cellulose glycollic acid; cellulose hydroxyethyl ether; the mixed derivatives of cellulose prepared by reacting the same with an acid anhydride and an aldehyde simultaneously; cellulose acetals; cellulose ether esters; esterified half acetals; sodium ether derivatives; cellulose addition compounds; amino cellulose; sodium cellulosate; etc., etc.

Among the commercially available polymers that readily lend themselves to the production of potentially reactive compositions that can be cured to an infusible and insoluble state by admixture with the saturated halogenation products of the mono hetero atomic five membered rings and their reactive derivatives are the acetals of the polyvinyl alcohol. As is well known, the acetal groups result from the condensation of aldehydes with alcoholic (OH) groups. The curing agents around which the present invention centers are capable of reacting to a greater or less degree with the acetal group, perhaps by decomposing the same. In practice, however, it should be noted that the commercial acetals are all incomplete reaction products inasmuch as they still contain a plurality of alcoholic (OH) groups. Commercial acetals therefore contain both alcoholic (OH) groups and acetal groups. The alcoholic (OH) group is much more susceptible to reaction with the herein mentioned types of curing agents than are the acetal groups. As a consequence the greater the number of alcoholic (OH) groups in the polyvinyl acetal, the more readily it can be cured via said curing agents. Uncured polyvinyl acetal stocks are possessed of at least three disadvantages: (1) they have a tendency toward tackiness so that articles processed out of them when pressed together for an appreciable length of time, particularly in warm surroundings, tend to glue together; (2) uncured polyvinyl acetals behave as true thermoplastics and as such lose their strength, soften and virtually melt under the influence of heat; (3) uncured polyvinyl acetals are soluble in and cannot be used in the presence of solvents such as methanol, ethanol, iso-butylene, iso-propanol, butanol, the lower mono-ethers of ethylene glycol, etc. The afore mentioned limitations and drawbacks which are more or less inherent in the polyvinyl acetals as such can be mitigated or indeed altogether eliminated by converting the same over into a substantially thermo-rigid and insoluble vulcanized state through the use of herein mentioned types of curing agents. We present in Table XIV some representative formulations typical of stock suitable for press molding, injection molding or extrusion.

TABLE XIV

| Example | 4a | 4b | 4c |
|---|---|---|---|
| | Parts | Parts | Parts |
| polyvinyl butyral | 60.0 | 60.0 | 60.0 |
| dibutoxy Cellosolve phthalate | 40.0 | 40.0 | 40.0 |
| curing agent No. 17,812 | 10.0 | 10.0 | 10.0 |
| curing agent No. 17,792 | | 5.0 | |
| aluminum tristearate | 10.0 | 10.0 | 10.0 |
| zinc oxide | 5.0 | 5.0 | 10.0 |
| magnesia | 0 | 0 | 3.0 |
| stearic acid | 1.5 | 1.5 | 1.5 |
| Heliozone (blend of waxes) | 0.5 | 0.5 | 0.5 |
| petroleum resins | 0 | 3.0 | 0 |
| hydrated alumina | 0 | 27.0 | 0 |
| titanium dioxide | 0 | 0 | 86.1 |
| red pigment | 0 | 0 | 0 |

PHYSICAL PROPERTIES (CURED AT 300° F. FOR 30 TO 40 MINUTES)

| | | | |
|---|---|---|---|
| Tensile strength | 3,074 | 3,360 | 4,830 |
| Elongation, Per Cent | 206 | 200 | 75 |
| Hardness, Durometer-A | 87–83 | 91–88 | 75 |

Curing agent No. 17812 above referred to was produced by reacting chlorinated furfural with methanol in the presence of zinc dust, which upon isolation yielded a substantially odorless and hard product which was then dissolved in an equal weight of triethyl citrate. The above type of curing agent is substantially odorless and non-corrosive to the skin and typifies a curing agent recommended in applications where freedom of corrosion and danger of dermatitis must be avoided. In the above formulation the zinc oxide functions as an activator as does also the magnesia which latter acts also as an acid acceptor. The aluminum tristearate functions as a blister inhibitor.

Excellent proofing preparations suitable for coating and treating textile fabrics, e. g., hospital sheetings and rain coatings can be prepared. The following formula is representative:

*Example 4e.—*

| | Parts by weight |
|---|---|
| Polyvinyl butyral | 4.00 |
| Dibutoxy ethyl phthalate | 3.00 |
| Alcohol | 30.00 |
| Butyl alcohol | 1.50 |
| Zinc oxide | 0.36 |
| Aluminum tristearate | 0.72 |
| Stearic acid | 0.06 |
| Yellow oxide | 0.30 |
| Channel black | 0.04 |
| Hydrated alumina | 1.20 |
| Calcium carbonate | 1.20 |
| Curing agent No. 17792 | 0.20 |

The curing agent should not be added until after all the other ingredients have been thoroughly dispersed. The dispersion is suitable for the preparation of army raincoatings.

Polyvinyl acetals when used in conjunction with the herein referred to types of curing agents are admirably adapted for the production of cements and adhesives. These preparations may also be utilized as surface coatings for metals, particularly aluminum. They are also adapted for use as prime coatings. The following recipe is typical of a formulation designed to secure maximum adhesion to aluminum metal.

*Example 4f.—*

| | Parts by weight |
|---|---|
| Polyvinyl butyral | 4.0 |
| Plasticizer | 0.4 |
| Ethyl alcohol | 12.0 |
| Ethyl acetate | 12.0 |
| Zinc oxide | 0.3 |
| Aluminum tristearate | 0.6 |
| Yellow oxide | 0.3 |
| Calcium carbonate | 0.6 |
| Titanium dioxide | 0.4 |
| Curing agent No. 17585 | (See below) |

The above ingredients "in toto" excluding the curing agent should be well dispersed. One should then add 4 ml. of curing agent No. 17585 per ounce of the dispersion, either just prior to use or within a week's time of the time it is to be used. Curing agent No. 17585 is prepared by adding to ten ounces of curing agent No. 17792 enough toluene to bring the volume up to a litre. For the best results, and particularly where it is desired to utilize the above preparation for adhering to aluminum, it is necessary to first coat the metal with a thin film of curing agent No. 17585 and allow it to air-dry a few minutes. The above dispersion, including the curing agent, may then be applied and after air-drying may be baked at 300° F. for a period of about 45 minutes, whence a firmly adhering coating is procured which is more mar resistant than the aluminum itself.

Potentially reactive compositions may be procured by mixing the herein described curing agent with cashew nut shell liquid or its various derivatives, as well as the oils of other botanically related species. Not infrequently such compositions are highly compatible with other polymers. The following example illustrating the production of a textile proofing dispersion is typical.

*Example 5a.—*

| | Parts by weight |
|---|---|
| Chloro-anacardic material No. 18926 | 4.00 |
| Polyvinyl butyral | 4.00 |
| Toluene | 19.00 |
| Alcohol | 15.00 |
| Butanol | 1.50 |
| Dibutoxy ethyl phthalate | 2.50 |
| Methyl acetate | 0.50 |
| Petroleum resin | 0.15 |
| Zinc oxide | 0.80 |
| Magnesia | 0.20 |
| Aluminum tristearate | 0.60 |
| Yellow oxide | 0.60 |
| Channel black | 0.06 |
| Stearic acid | 0.09 |
| Phenyl ethanolamine | 0.02 |
| Calcium carbonate | 1.50 |
| Hydrated alumina | 1.50 |
| Wax | 0.06 |
| Curing agent No. 17792 | 0.40 |

The chloro-anacardic material above referred to is prepared after the manner outlined in the applicants' Letters Patent No. 2,306,077. In preparing the above solution all ingredients, excluding the curing agent, should be thoroughly dispersed before the curing agent is added. Coated goods are advantageously dusted with an antiblocking agent, e. g., mica dust, before curing. By leaving out the solvents in the above formulation and milling the ingredients upon differential rolls a stock excellently adapted to calendering operations is obtained. Such materials can also be press-cured at temperatures ranging between 275° F. and 310° F. for a period of from 30 to 45 minutes. The articles may be pulled hot. When using polyvinyl butyral in conjunction with chloro-anacardic material, the curing agent serves not only to cure both materials individually but also tends to cross-link the two together.

Through the use of the saturated halogenation products of the aldehydes of the mono hetero atomic five membered rings and their reactive derivatives it is possible to prepare curable compositions out of such diverse materials as urea resins; thiourea resins; melamine resins; alkyl urea resins; various sugars; starches; degenerated starch products, e. g., dextrine; polyethers, e. g., those of glycerol; phenol formaldehyde resins; phenol furfural resins; tars, pitches and asphalts; animal and vegetable glues, casein; zeins; rosin; linear superpolyamides, e. g., nylon; etc., as is exemplified by the following examples.

*Example 6a.—*

| | Parts by weight |
|---|---|
| Hide glue (451 grams, 164 millipoises) | 3.00 |
| Water | 7.50 |
| Sodium phenyl phenate | 0.03 |
| Ethyl lactate | 0.30 |

The above ingredients are mixed together and heated to 160° F. and maintained at that temperature for a period of 15 minutes and then cooled down to room temperature whence a firm gel forms. To ten parts of the above composition, previously warmed to melt the same, there is added 1.50 parts of curing agent No. 22382-C. When the above composition is applied to a glass panel and cured at 300° F. for a period of 45 minutes a cured transparent film results. This film adheres excellently to glass and when an attempt is made to scrape it off with a razor blade much glass is pulled and broken out of the glass plate. In a typical case it was found that 91.6% of the animal glue had become insolubilized. When the above glue is used to bond plywood veneers, products of excellent shear strengths result. Upon immersion in water for 24 hours a considerable proportion of the original dry strength is retained in contrast to products made without curing agent which quickly delaminate upon immersion in water. Curing agent No. 22382-C is produced by reacting the saturated chlorination product of furfural with an excess of methanol, then subjecting it to high vacuum distillation and reacting eleven parts of the distillate with nine parts of glyceral, one part of water and 0.1 part of zinc oxide at temperatures in the neighborhood of 230° F. for a period of approximately an hour, until a loss in weight of 4.17 parts occurs. The resultant product is substantially water soluble and is representative of a type of reactive derivative that is recommended for use in aqueous systems.

*Example 6b.—*This example is similar to the above except that in lieu of chlorinated furfural the saturated bromo-chloro halogenation product of the aldehyde of methyl thiophen was used. Bonds of good water resistance are gotten.

*Example 7a.—*A casein solution is prepared in the usual manner. To this is added curing agent No. 22382-C admixed with mono-ethanolamine. Upon subjecting this potentially reactive composition to a temperature of 300° F. for a period of 30 minutes, a cured product results.

*Example 8a.—*To 100 parts of a commercial solution of zein there are added ten parts of the chloro-bromo halogenation product of pyrrol aldehyde. When spread upon a hotplate maintained at 300° F., the product readily cured to infusibility.

*Example 9a.—*To 100 parts of an alcoholic solution of nylon (50%) there are added 10 parts of the chloro-fluoro halogenation product of furfural. The resultant composition, after elimination of the alcohol, becomes infusible and insoluble by subjecting it to temperatures in the neighborhood of 275° F.

*Example 10a.—*To 100 parts of an aqueous urea formaldehyde resin solution there are added 6 parts of curing agent No. 22382-A (produced by reacting the high vacuum distillate of the methanol reaction product of chlorinated furfural with glycerin). The above composition is useful as a plywood adhesive, yielding dry shear strengths of 587 p. s. i. and wet shear strengths of 550 p. s. i. when cured at a temperature of 220° F. (birch wood).

*Example 10b.—*To 100 parts of an aqueous urea formaldehyde resin syrup there are added 4 parts of curing agent No. 22426 (produced by reacting the curing agent referred to in Example 10a with monoethanolamine). When this product was used as a plywood adhesive on birch wood and cured at 220° F., it yielded dry shear strengths of 515 p. s. i. and wet shear strengths of 507 p. s. i.

*Example 11a.—*To 100 parts of a thiourea-formaldehyde resin syrup there are added 10 parts of curing agent No. 22382-C. The resultant composition may be cured at temperatures in the neighborhood of 250° F.

*Example 12a.*—To 100 parts of a conventional melamine formaldehyde resin there were added ten parts of curing agent No. 22382-C. At temperature of 300° F. the composition quickly cured when smeared upon a hot plate.

*Example 13a.*—An alkyl urea resin, prepared by reacting urea and formaldehyde in the presence of butanol, was mixed with ten percent of its weight with curing agent No. 17792. When used as a surface coating and subjected to a bake at 300° F., the material quickly cured to a highly resistant finish.

*Eample 14a.*—A processed starch (e. g., dextrine) was mixed with 20% of its weight with curing agent No. 22382-C. The resultant composition yielded a hard, glossy film when spread upon a hot plate maintained at 250° F. Similar results are procured when in lieu of the chlorination product we utilize products containing iodine, bromine or fluorine.

*Example 15a.*—Sugar was caramelized by heating it in the presence of a small quantity of water until the equivalent of two molecules of water were eliminated. To 100 parts of the above material the glycerol reaction product of the distillate of the methanol reaction product of the saturated chloro-iodo halogenation product of methyl furfural was added. The resultant product readily cured to a hard and infusible mass, insoluble in all common solvents, when subjected to a temperature of 300° F. on a hot plate.

*Example 16a.*—Seventy-eight parts of glycerin are mixed in a beaker with twelve parts of the high vacuum distillate of the methanol reaction product of the saturated chlorination product of furfural. The mixture was set on a hot plate maintained at 310° F. The mixture bubbled and frothed and a gradual loss in weight occurred. After ten days the product had become very viscous and was grindably hard at room temperature. A peculiar attribute of the product resided in the fact that it was susceptible to thread pulling, i. e., when the molten mass was touched with a glass rod and the rod pulled away a continuous thread could be formed which could be wound onto a reel. When to the above composition there was added a curing agent such as No. 17810 (already described) the resultant potentially reactive compositions proved useful as surface coatings which could be cured at temperatures in the neighborhood of 300° F.

*Example 17a.*—A glycerol polyether, prepared by reacting glycerol in the presence of sodium acetate to elevated temperatures, was admixed with curing agent No. 20316 (high vacuum distillate of the methanol reaction product of chlorinated furfural) in the proportions of 75% to 400% on the weights of the polyglycerol. When heated to temperatures of approximately 250° to 300° F. the products quickly were transformed into rubbery masses which, unlike those prepared from glycerin were not susceptible to thread pulling. The above rubbery products could be cured to a hard state through the subsequent incorporation of the saturated halogenation products of the aldehydes of furfural, thiophen and pyrrole and subjecting the masses to temperatures of about 300° F.

*Example 18a.*—To 100 parts of a gas tar pitch (soft and sticky at ordinary temperatures) there were added 5 parts of curing agent No. 17892. Upon heating to 250° F., a mild reaction set in. Upon cooling, a grindably hard product resulted which was readily fusible upon a 220° F. hot plate. This is a typical instance where the curing agents herein referred to are utilized to yield a partial cure with the view of elevating the softening point of a composition rather than effecting a complete cure to the ultimate thermo-rigid state. In a similar manner it is possible to elevate the softening point of the vast majority of polymeric substances including resins, cellulose derivatives, etc.

*Example 19a.*—A phenol formaldehyde resin of the permanently fusible Novolak type (100 parts) is admixed with 20 parts of curing agent No. 17792 and 5 parts of magnesium oxide. The resultant composition readily sets up to an infusible state upon heating.

*Example 19b.*—To 100 parts of a permanently fusible phenol furfural resin there are added 20 parts of the chlorination product of pyrrole aldehyde and 5 parts of magnesia plus 5 parts of red iron oxde. The resultant potentially reactive mixture readily cures by subjecting it to temperatures in the neighborhood of 250° F.

*Example 19c.*—To 100 parts of a permanently fusible cresol acetaldehyde resin there are added 20 parts of the methanol reaction product of the chloro-fluoro halogenation product of thiophen aldehyde. A mixture of magnesia, zinc oxide, and red iron oxide was used as catalyst. When applied as a surface film it could readily be cured at temperatures of 300° F. to yield infusible and substantially insoluble products.

*Example 19d.*—

| | Parts by weight |
|---|---|
| Phenol-formaldehyde resins (permanently fusible type) | 100 |
| Curing agent No. 17774 | 10 |
| Iron oxide, red | 10 |

In preparing the above combination, the resin is first fused and the curing agent is then added. Finally the iron oxide is incorporated. Upon cooling, the grindably hard resin is ground to a fine powder. The above resin can readily be cured to infusibility when spread upon a hot plate at 310° F. Curing agent No. 17774 is prepared by reacting the saturated chlorination product of furfural with methanol by refluxing the mixture for an hour and a half and then distilling off the volatiles under a twenty-four inch vacuum. A mixture of water and benzene is then added to the residuum. After stratification, the organic layer is separated and subjected to concentration under a twenty-four inch vacuum and finally under a high vacuum.

The applicants wish to point out that the saturated halogenation products of the aldehydes of the mono hetero atomic five membered rings and their reactive derivatives are deadly to all forms of life with which they may come in contact. Hence by properly incorporating these materials into a product, the resultant material is rendered immune to the ravaging effects of bacteria and fungus. Thus the inclusion of such a curing agent in a cellulose preparation or in a phenolic resin will impart to the same fungicidal properties which will effectively prevent fungus growth even in the tropics. An important advantage of this type of curing agent as regards its fungicidal efficacy resides in the fact that after curing it is substantially non-volatile and will therefore not be driven out upon prolonged exposure to elevated temperatures and further, because it is integrally tied into the structure, it cannot be leached out, thus assuring permanency.

*Example 20a.—*

| | Parts by weight |
|---|---|
| Chlorinated furfural | 100 |
| Rosin | 100 |
| Activated carbon | 10 |

Each of the organic materials is fused separately. The carbon is then stirred into the fused chlorinated furfural. This mixture is then poured into the molten rosin and is vigorously stirred. The mixture is kept hot until a sample on testing indicates that a grindably hard product (when cold) has been procured. This type of product is of particular interest where it is desirable to use an acidic curing agent in powdered form—e. g., the above material is an effective catalyst in curing phenol-furfural resins with hexamethylenetetramine.

*Example 21a.—*A thiophenol is condensed with formaldehyde to form a resin. 100 parts of the aforesaid resin are admixed with 10 parts of the chloro-bromo halogenation product of furfural along with 10 parts of red iron oxide. The resultant composition is potentially reactive and readily cures at temperatures of 300° F. to yield an infusible thermo-rigid product.

*Example 22a.—*The applicants have already pointed out that the saturated halogenation products of the aldehydes of the mono hetero atomic five membered rings and their reactive derivatives are not ordinarily reactive with double bonds. However, upon prolonged subjection to elevated temperatures reaction often does ensue. The reaction can usually be accelerated by the inclusion of catalysts such as aluminum chloride, boron fluoride, etc. The following example is typical: 5 parts of natural gum rubber are dissolved in 100 parts of benzine; 5 parts of chlorinated furfural are then added and the mixture is refluxed for a period of four hours, at the end of which time the volatiles are removed by distillation. The resultant gummy mass is then repeatedly extracted with a solvent such as methanol which, while not dissolving the rubber, will extract all unreacted chlorinated furfural or the soluble reaction products thereof which have been engendered during the processing. One ends up with a gray to tan colored rubbery mass which, unlike the original rubber, is no longer soluble or dispersible in benzine. The rubber in effect has become more or less vulcanized. The product may be further vulcanized by milling it with sulphur and the usual rubber accelerators and then subjecting the same to curing temperatures.

*Example 23a.—*A mixture of ten parts of indene and one part of nitro-indene is polymerized in the usual manner. The resinous polymer is then subjected to an energetic reduction resulting in the conversion of the nitro groups to amino groups. One hundred parts of the resultant amino group containing resin is mixed with ten parts of the methanol reaction product of chlorinated furfural. Zinc oxide, magnesia and red iron oxide are effective catalysts. Upon subjecting the above potentially reactive mixture to temperatures of 300° F., it readily cures to an infusible thermo-rigid state in contrast to the usual polyindene resins which are permanently thermoplastic.

*Example 24a.—*A four-pound cut of unbleached shellac in ethyl alcohol is prepared. Curing agent No. 22382-C is then added (10% on the weight of the shellac). It is desirable to include 1% to 3% of magnesia. When the above spirit varnish is applied as a surface coating it is readily cured to an infusible and insoluble state upon subjection to temperatures of 250° F. or higher.

*Example 25a.—*One hundred parts of a thick and viscous formaldehyde-acetone condensation product of the type disclosed in U. S. Patent No. 2,191,802 is mixed with 15 parts of curing agent No. 22382-C. It is advantageous to include zinc oxide or magnesia as a catalyst. The above mixture is potentially reactive and upon heating to a temperature of 300° F. readily sets up to an infusible and insoluble state.

*Example 26a.—*One mole of resorcinol is reacted with five-eighths of a mole of formaldehyde. The resultant condensation product is substantially permanently thermoplastic. Curing agent No. 17792 (10% on the resin weight) may be used to effectively cure the product to the infusible, insoluble state.

*Example 27a.—*Phthalic anhydride is condensed with glycerol in a manner such that the resultant alkyd resin contains plurality hydroxy groups. In the presence of catalysts such as zinc oxide, magnesium oxide, copper oxide, etc., the above resin may readily be cured at temperatures in the neighborhood of 300° F. upon admixture with any of the saturated halogenation products of the aldehydes of the mono hetero atomic five membered rings and their reactive derivatives.

*Example 28a.—*A polyethyl silicate resin is rendered susceptible to cure through introduction of a plurality of amino groups in any of the conventional ways. One hundred parts of such an amino group containing resin is then mixed with ten parts of the secondary amyl alcohol reaction product of chlorinated furfural. Magnesia or zinc oxide may be included. The resultant product is potentially reactive and may be cured at temperatures in the neighborhood of 300° to 350° F.

*Example 29a.—*A petroleum resin is subjected to partial chlorination followed by saponification via aqueous sodium hydroxide under pressure. To 100 parts of the resultant hydroxy group containing resin there are added 10 parts of chlorinated furfural along with 5 parts of zinc oxide and 3 parts of magnesia. The resultant composition is potentially reactive and may readily be cured by heating to 300° F.

*Example 30a.—*Ten moles of styrene are interpolymerized with one mole of amino styrene in the presence of benzoyl peroxide as catalyst. To 100 parts of this polymer there are added 15 parts of curing agent No. 17810 along with 5 parts of magnesia, 5 parts of zinc oxide and 5 parts of red iron oxide. The resultant mixture is potentially reactive and when smeared upon a hot plate at 310° F. readily cured to an infusible and insoluble state. By incorporating a smaller quantity of amino groups and using less curing agent, it is possible to procure a product whose physical properties, softening points, etc., are intermediate between those of the nominally permanently fusible or thermoplastice polystyrenes and the infusible thermo-rigid products. These remarks of course also apply to the majority of examples described in these specifications. In lieu of amino styrene one may interpolymerize the styrene with nitro styrene, and then subject the resultant polymer to conditions of energetic reduction which results in the transformation of a large percentage of the nitro groups into amino groups which, as has already been stated, constitutes functionally reactive atomic groups susceptible to cure via the herein described curing agents.

*Example 30b.*—Polyisobutylene is chlorinated so as to contain between 20 and 30 parts of chlorine on the weight of the polymer. The chlorinated polymer is then subjected to saponification via aqueous sodium hydroxide under pressure or, alternatively, it is heated with concentrated aqueous ammonia in a high pressure autoclave. The resultant rubbery hydroxy group or amino group containing polymer (100 parts) is mixed with 10 parts of curing agent No. 17810 along with 5 parts of zinc oxide, 5 parts of magnesia and 10 parts of red iron oxide. The mixing is conveniently carried out upon hot differential rolls. Lubricants and fillers are advantageously included. The above compositions are potentially reactive and may be cured at temperatures of about 310° F. in 60 minutes' time to yield rubbery products. The tensile strength, elongation at break, elasticity, hardness, etc., depends upon the quantity of functionally reactive atomic groups introduced into the polymer, as well as upon the quantity and type of curing agent, filler, plasticizer, etc. included in the formulation.

*Example 31a.*—Vinyl acetate is polymerized in the presence of benzoyl peroxide as catalyst. When the resultant polymer is subjected to saponification so as to substitute for 10% of the acetyl groups alcoholic (OH) groups, the resultant product can readily be cured to an infusible, insoluble state by heating the same to temperatures of 300° F. in the presence of a curing agent such as typified by No. 17792. It is advantageous to include aluminum tristearate, zinc oxide and magnesia. Plasticizers and fillers may be incorporated.

*Example 32a.*—A rubbery resinous material is prepared as follows: Purified isobutylene is polymerized at low temperatures in the presence of boron fluoride to yield polyisobutylene. The polyisobutylene is then dissolved in a mixture of aliphatic hydrocarbons with a boiling point of 150° C. and is subjected to the action of concentrated nitric acid in the presence of concentrated sulphuric acid (10% $H_2SO_4$ on the weight of $HNO_3$) at temperatures in the neighborhood of 150° C. It is desirable to continue the oxidation until between 10% and 20% of oxygen has been introduced into the polyisobutylene. The resultant complex oxidation product is susceptible to cure via the saturated halogenation products of the aldehydes of the mono hetero atomic five membered rings and their reactive derivatives. For example, upon mixing oxidized polyisobutylene (containing 18% oxygen and having a molecular weight of approximately 50,000) with a curing agent produced by reacting the chlorination product of ethyl pyrrol aldehyde with sodium sulfide in the presence of methanol, the resultant product was potentially reactive and could be readily cured at temperatures in the neighborhood of 300° F.

*Example 33a.*—Upon subjecting the oxidized polyisobutylene of Example 32a to chlorination, the resultant oxidized chlorinated polyisobutylene yielded a potentially reactive composition upon admixture with the saturated bromination product of furfural which could be cured on heating.

*Example 34a.*—Twelve parts of an acetone formaldehyde condensation product (e. g. standard "afr" as described in U. S. Patent No. 2,191,802) is refluxed with 16 parts of 37½% formaldehyde solution. The mixture is then concentrated at atmospheric pressure until the temperature of the residuum reaches 350° F. The resultant formalization product of "afr" can readily be cured to a thermo-rigid and infusible state by heating with any of the aforementioned curing agents, e. g., with the saturated chlorination product of ethyl thiophen aldehyde.

*Example 35a.*—A resin is produced by reacting 11.8 parts of the liquid condensation product of furfuracetone with 8.0 parts of formaldehyde (37½% HCHO) in the presence of one part of 4 N/NaOH. The mixture is heated and kept at 100° C. for about 4 hours and then vacuum concentrated until the temperature of the residuum reaches 325° F. When 100 parts of the above resinous material are mixed with 15 parts of curing agent No. 17792 and 5.0 parts of zinc oxide, the resultant composition is potentially reactive and readily cures at temperatures of about 300° F.

*Example 35b.*—A resin is prepared by reacting 11.8 parts of liquid furfuracetone condensation product with 9.3 parts of aniline in the presence of one part of concentrated hydrochloric acid. The mixture is heated and kept at 100° C. for a period of three hours and then is vacuum concentrated until the temperature of the residuum reaches 325° F. Upon mixing the resultant grindably hard, black-colored resin (100 parts) with 15 parts of curing agent No. 17792 and 5.0 parts of zinc oxide a potentially reactive composition results which may be cured to an infusible state by heating it to about 300° F. or at lower temperatures over longer periods of time. Material such as paraformaldehyde may be included to further expedite the cure.

*Example 35c.*—A resin is prepared by mixing 11.8 parts of liquid furfuracetone condensation product with 9.0 parts of furfural in the presence of 0.25 part of concentrated hydrochloric acid dissolved in 5.0 parts of water. The mixture is heated to 100° C. and kept there for a period of three hours. There is then added 0.6 part of 4 N/NaOH and the mixture is then vacuum concentrated until a temperature of 300° F. is reached. When 100 parts of the above resinous material are mixed with 15 parts of curing agent No. 17792 and 5.0 parts of zinc oxide the resultant composition is potentially reactive and readily cures at temperatures of about 300° F.

*Example 35d.*—One hundred parts of the resin of Example 35a was mixed with 100 parts of phenol-formaldehyde resin. To the resultant mixture there was then added 25 parts of curing agent No. 17792 plus 5 parts of curing agent No. 17810 along with 5 parts of zinc oxide. The resultant mixture is potentially reactive and can be readily cured to an insoluble and infusible state upon the application of heat or even at room temperature over prolonged periods of time.

*Example 35e.*—A resin is prepared by reacting 11.8 parts of liquid furfuracetone condensation product with 9.4 parts of phenol in the presence of 0.5 part of concentrated hydrochloric acid dissolved in 3 parts of water. The mixture is heated at 100° C. for about one hour and a half and there are then added 1.3 parts of 4 N/NaOH and the mixture is then heated at 100° C. for an additional half hour. The product is then vacuum concentrated until the residuum reaches a temperature of 325° F. The resultant resin can be cured to the infusible state upon heating with 10% of curing agent No. 17792.

*Example 36a.*—A resin is prepared by reacting the distillation product of acetylated cashew nut shell liquid with formaldehyde so as to yield a more or less thermoplastic product. In lieu of formaldehyde, even better results may be procured by reacting the distillation product of acetylated cashew nut shell liquid with hexamethylenetetramine to temperatures of about 300° F. so as to result in highly viscous syrupy products. When 100 parts of either of the above reaction products are mixed with about 10 to 20 parts of a curing agent, such as No. 17792, potentially reactive mixtures result which gradually set up to infusibility at room temperature or more rapidly by heating to temperatures of about 300° F.

*Example 37a.*—A high molecular weight paraffin is chlorinated so as to contain approximately 20% of chlorine. The chlorinated paraffin is then subjected to reaction with concentrated sodium hydroxide under pressure at elevated temperatures. The resultant product is susceptible to cure and upon admixture with 15 parts of curing agent No. 17810 in the presence of 5 parts of magnesia plus 5 parts of red iron oxide, can readily be cured to the infusible state upon heating to temperatures of about 300° F.

*Example 38a.*—Ethylacrylate is polymerized in the presence of benzoyl peroxide. The polyethylacrylate is then subjected to partial or complete saponification via sodium hydroxide. The resultant polymer contains free carboxyl groups which latter are not functionally reactive and therefore do not impart susceptance to cure to the polymer via the herein mentioned curing agents. However, when the above carboxyl containing polymer is reacted with an excess of ethylene glycol so as to consume all the carboxyl groups via a reaction of esterification there is produced a polymer containing hydroxyl group which is curable, e. g., when 100 parts of the ethylene glycol reaction product of the aforementioned saponified polyacrylic ester polymer is mixed with 15 parts of curing agent No. 17810 in the presence of zinc oxide the product is potentially reactive and can be cured upon heating.

*Example 39a.*—Polyvinylidine chloride is subjected to partial saponification via a concentrated solution of aqueous sodium hydroxide under pressure. The resultant hydroxylated product (100 parts) upon admixture with 15 parts of curing agent No. 17810 plus 5 parts of zinc oxide could readily be cured to the infusible state upon heating.

*Example 40a.*—Styrene (6.0 parts) is interpolymerized with vinyl pyridine (1.2 parts) dissolved in 18 parts of toluene in the presence of 0.3 part of benzoyl peroxide as catalyst. The resultant resin upon isolation could be converted to the infusible and insoluble state upon admixture with 10% of curing agent No. 17810 along with 5 parts of zinc oxide and 5 parts of red iron oxide when heated to temperatures of about 300° F.

*Example 41a.*—Allyl acetate is polymerized in the presence of benzoyl peroxide as catalyst. The resultant liquid product is then subjected to partial saponification via 8 normal sodium hydroxide solution so that 10% of the acetyl groups are replaced by hydroxy groups. The resultant hydroxylated polyester (100 parts) upon admixture with 10 parts of curing agent No. 17792 and 5 parts of magnesia plus 5 parts of zinc oxide can readily be converted to the infusible state upon heating to about 300° F.

*Example 42a.*—A polyethylene polyamine mixture (prepared by reacting ethylene dichloride with ammonia under pressure) is reacted with aqueous formaldehyde solution. The resultant product after isolation was readily converted to the infusible thermo-rigid state upon heating with 10 parts of curing agent No. 17792.

*Example 43a.*—One hundred parts of a polyethylene polyamine mixture (see above) is reacted with 200 parts of an acetone formaldehyde condensation product (e. g., standard "afr"). The mixture is heated and the volatiles are let escape until the temperature of the residuum reaches 350° F. When 100 parts of the above residuum are mixed with 15 parts of curing agent No. 17792 a potentially reactive mass results which can be cured to the infusible state by heating to about 300° F.

*Example 44a.*—Resins representing the imides of acid anhydride resins are quite susceptible to cure via the herein mentioned types of curing agents. E. g., potentially reactive compositions may be prepared by mixing 100 parts of styrene phenylmaleinimide resin with 15 parts of the curing agent No. 17792. Upon heating such products to temperature of 300° F. they are cured to the infusible state.

*Example 45a.*—Vinyl acetate is interpolymerized with methylvinyl ketone in the presence of benzoyl peroxide as catalyst. The resultant copolymer is then subjected to saponification (50%). The engendered alcoholic groups are then acetalized, e. g. they may be subjected to formalization by reaction with formaldehyde. The resultant polymers can readily be cured, e. g., by admixture with curing agent No. 17792 (10%) and heating to 300° F. Instead of acetalizing the alcoholic (OH) groups as above engendered they may be ketalized via reaction with appropriate ketones, e. g., acetone.

*Example 46a.*—Vinylacetate is interpolymerized with the divinyl ketone. A more or less cross-linked polymer results. Notwithstanding the cross-linking the polymer can be saponified and then ketalized or acetalized. The resultant cross-linked acetalized or ketalized, or acetalized and ketalized polymers can be further cross-linked and cured to a hard thermo-rigid condition with the herein described types of curing agents. E. g., the above referred to vinyl acetate-divinyl ketone polymer is hydrolized via a NaOH solution until three-quarters of the ester groups have been replaced by OH groups. The resultant OH group containing polymer is then subjected to the action of formaldehyde in the presence of HCl as catalyst, after which the formalization product is isolated in the usual manner. One hundred parts of the above cross-linked formalization product upon admixture with 15 parts of curing agent No. 17792 plus 5 parts of magnesia plus 5 parts of zinc oxide plus 5 parts of red iron oxide yields a potentially reactive mass which upon heating to temperatures in the neighborhood of 300° F. can readily be cured and converted to an infusible, insoluble condition.

Many of the saturated halogenation products of the mono hetero atomic five membered rings as well as their reactive derivatives are admirably suited to the vulcanization of butadiene-acrylonitrile-type copolymer rubber. It has been experimentally established that a molecule of the active principle of a curing agent such as No. 17810 has about three times the vulcanizing potentiality as an atom of sulphur. When properly used a curing agent such as No. 17810 permits one to secure out of butadiene-acrylonitrile copolymer rubbers vulcanizates possessed of outstanding physical attributes, of which the following are typical: much higher tensile strength; unexcelled elongation; superior aging qualities; lower modulus; low pigmentation concomitant with superior physicals; non-carbon pigmented stocks of great strength; colored stocks with unexcelled physicals; soft stocks with superior physicals; better oil resistance; better resistance to fleck cracking; superior heat-resistant stock; etc.

For the best results we recommend the inclusion of from 5.0 to 10.0 parts of zinc oxide and 2.0 to 5.0 parts of magnesium (extra light, calcined). These oxides exert a highly beneficial effect in markedly speeding up the cure and endowing the resultant vulcanizates with distinctly superior properties. We further recommend the inclusion of from 1.5 to 5.0 parts of aluminum tristearate. This material functions as a "modifier" that tends toward the achievement of greater uniformity, freedom from blistering, etc. The usual rubber accelerators are unnecessary. However, many of the better known accelerators do exert a beneficial effect, functioning as regulators, etc., and therefore their presence is often advantageous. The effect of anti-oxidants in compounds containing curing agents such as No. 17810 is much the same as that imparted in the instance of sulphur compound. There are indications, however, that compounds vulcanized with curing agent No. 17810 are inherently more resistant to the ravages of oxygen. Furthermore many of the anti-oxidants react with the afore-said curing agent and as a consequence they function in a somewhat different manner.

One of the unique attributes of a curing agent such as No. 17810 is that its use permits the procurement of strong, tough vulcanizates when using exceedingly low loadings. Such lightly loaded vulcanizates constitute a distinct novelty in the field of synthetic rubber compounding. Fillers of the most diverse nature, in small or large quantities, may be utilized. Non-carbon pigments, of which hydrated alumina, processed clay, and titanium dioxide are among the most effective, readily permit the procurement of tensile strengths of in the neighborhood of 5,000 p. s. i.

We present the following tabular data as a guide to the rubber technician in formulating experimental or factory compounds designed for specific applications and specifications.

TABLE XV

| Example | 47a | 47b | 47c | 47d | 47e | 47f |
|---|---|---|---|---|---|---|
| Butadiene-acrylonitrile copolymer rubber | 100.00 | 100.00 | 100.00 | 100.00 | 100.00 | 100.00 |
| Curing agent No. 17,810 | 12.21 | 12.21 | 12.21 | 12.21 | 12.21 | 8.91 |
| Zinc oxide | 8.88 | 8.88 | 8.88 | 8.88 | 6.48 | 6.48 |
| Magnesia | 3.33 | 3.33 | 3.33 | 3.33 | 2.16 | 2.16 |
| Aluminum tristearate | 5.55 | 5.55 | 5.55 | 5.55 | 5.40 | 5.40 |
| Phenylbetanaphthylamine | 1.11 | 1.11 | 1.11 | 1.11 | | |
| Santocure [1] | 1.66 | 1.66 | 1.66 | 1.66 | 1.62 | 1.62 |
| Wax blend | 0.55 | 0.55 | 0.55 | 0.55 | 0.54 | 0.54 |
| Stearic acid | 1.11 | 1.11 | 1.11 | 1.11 | 1.08 | 1.08 |
| Semi-soft carbon black | 16.65 | 83.25 | | | | 16.21 |
| Hard reinforcing carbonblack | | | 38.85 | 55.50 | 11.89 | |
| Dioctyl phthalate | 21.09 | 10.00 | 10.00 | 10.00 | 27.02 | 32.43 |
| Total | 172.14 | 227.65 | 183.25 | 199.90 | 165.10 | 174.83 |

PHYSICAL PROPERTIES (CURED AT 310° F. FOR A PERIOD OF 45 MINS.)

| | 47a | 47b | 47c | 47d | 47e | 47f |
|---|---|---|---|---|---|---|
| Original Properties: | | | | | | |
| Tensile Strength @ Break | 4,450 | 2,700 | 5,100 | 4,875 | 3,290 | 2,825 |
| Elongation @ Break, Per Cent | 725 | 535 | 550 | 480 | 770 | 820 |
| Hardness (Shore A Duro.) | 55-63 | 75-79 | 78-82 | 87-90 | 53-57 | 49-53 |
| Modulus @ 300% Elong | 520 | 1,954 | 2,086 | 3,543 | 350 | 243 |
| Modulus @ 500% Elong | 1,288 | 2,521 | 4,395 | | 911 | 559 |
| Tear Test, Die B: ASTM, D624-41T | 190 | 414 | 367 | 454 | 157 | 112 |
| Compression Set, Per Cent: ASTM, D395—37%, Meth. B | 9.6 | 7.10 | 7.50 | 7.30 | 7.70 | 12.70 |
| Rebound, Per Cent (Lupke) | 21.50 | 6.50 | 14.00 | 14.00 | 28.00 | 33.50 |
| Freeze (Brittle) Point, °C | −42 | −26 | −35 | −28 | −45 | −47 |
| In Sunoco Spirits (petroleum spirits) (48 hrs.): | | | | | | |
| Tensile Strength @ Break | 3,400 | 2,550 | 4,775 | 4,500 | 3,300 | 2,360 |
| Elongation @ Break, Per Cent | 670 | 525 | 530 | 470 | 710 | 790 |
| Hardness (Shore A Duro.) | 58-62 | 76-80 | 80-84 | 86-89 | 54-58 | 50-54 |
| Volume Change, Per Cent | +1.8 | +0.6 | +2.5 | +1.2 | +1.9 | +2.3 |
| Aged 4 days at 100° C.: | | | | | | |
| Tensile Strength @ Break | 5,000 | 2,900 | 5,150 | 4,900 | 4,675 | 3,500 |
| Elongation @ Break, Per Cent | 600 | 430 | 440 | 335 | 610 | 675 |
| Hardness (Shore A Duro.) | 66-70 | 83-88 | 83-88 | 90-93 | 55-59 | 50-53 |
| Sweat-out | much | slight | slight | slight | much+ | much |

[1] Santocure, trade name for benzothiazyl disulphide-cyclohexylamine.

TABLE XVI

| Example | 47g | 47h | 47i | 47j | 47k | 47m | 47n |
|---|---|---|---|---|---|---|---|
| Butadiene-acrylonitrile rubber | 100.00 | 100.00 | 100.00 | 100.00 | 100.00 | 100.00 | 100.00 |
| Curing agent No. 17,810 | 12.21 | 12.21 | 12.21 | 12.21 | 12.21 | 8.91 | 8.91 |
| Zinc oxide | 8.88 | 8.88 | 8.88 | 8.88 | 8.88 | 6.48 | 6.48 |
| Magnesia | 3.33 | 3.33 | 3.33 | 3.33 | 3.33 | 2.16 | 2.16 |
| Aluminum tristearate | 5.55 | 5.55 | 5.55 | 5.55 | 5.55 | 5.40 | 5.40 |
| Phenylbetanaphthylamine | | | | | 1.11 | 1.11 | |
| Santocure [1] | 1.66 | 1.66 | 1.66 | 1.66 | 1.66 | 1.62 | 1.62 |
| Wax Blend | 0.55 | 0.55 | 0.55 | 0.55 | 0.55 | 0.54 | 0.54 |
| Stearic Acid | 1.11 | 1.11 | 1.11 | 1.11 | 1.11 | 1.08 | 1.08 |
| Titanium Dioxide | 35.52 | | | | | | |
| Hydrated Alumina | | 17.76 | 4.44 | 83.25 | | 10.81 | |
| Processed Clay | | | | | 27.75 | | 12.97 |
| Iron Oxide, Red | | 5.55 | 5.55 | 5.55 | 5.55 | 5.40 | 5.40 |
| Dioctyl Phthalate | 10.00 | 21.09 | 10.00 | 10.00 | 21.09 | 21.62 | 27.02 |
| Total | 178.81 | 177.69 | 153.28 | 233.20 | 188.79 | 164.02 | 171.58 |

TABLE XVI—CONTINUED

| Example | 47g | 47h | 47i | 47j | 47k | 47m | 47n |
|---|---|---|---|---|---|---|---|
| PHYSICAL PROPERTIES (CURED AT 310° F. FOR A PERIOD OF 45 MINS.) | | | | | | | |
| *Original Properties:* | | | | | | | |
| Tensile Strength @ Break | 4,700 | 4,320 | 5,050 | 3,000 | 4,000 | 3,270 | 2,680 |
| Elongation @ Break, Per Cent | 655 | 720 | 670 | 520 | 670 | 800 | 810 |
| Hardness (Shore A Duro.) | 65–69 | 57–61 | 61–65 | 75–79 | 60–64 | 54–58 | 51–55 |
| Modulus @ 300% Elong | 607 | 563 | 601 | 2,122 | 688 | 311 | 315 |
| Modulus @ 500% Elong | 1,685 | 1,396 | 1,516 | 2,977 | 1,557 | 590 | 644 |
| Tear Test, Die B: ASTM, D624–41T | 200 | 215 | 167 | 362 | 191 | 135 | 125 |
| Compression Set, Per Cent, ASTM, D395–37T, Meth. B | 8.30 | 8.50 | 7.70 | 6.00 | 9.50 | 9.40 | 10.40 |
| Rebound, Per Cent (Lupke) | 13.00 | 19.00 | 12.00 | 14.00 | 18.50 | 27.00 | 27.00 |
| Freeze (Brittle) Point, ° C | −33 | −43 | −42 | −26 | −40 | −46 | −46 |
| *In Sunoco Spirits (48 hrs.):* | | | | | | | |
| Tensile Strength @ Break | 4,800 | 3,770 | 4,250 | 2,850 | 3,250 | 2,800 | 2,310 |
| Elongation @ Break, Per Cent | 660 | 695 | 660 | 520 | 650 | 755 | 775 |
| Hardness (Shore A Duro.) | 65–69 | 58–62 | 61–66 | 77–81 | 61–66 | 53–57 | 52–55 |
| Volume Change, Per Cent | +1.3 | +1.8 | +1.5 | +1.1 | +2.3 | +2.4 | +1.5 |
| *Aged 4 days at 100° C.:* | | | | | | | |
| Tensile Strength @ Break | 6,000 | 4,800 | 6,100 | 3,300 | 4,200 | 4,410 | 3,775 |
| Elongation @ Break, Per Cent | 575 | 590 | 565 | 400 | 550 | 660 | 670 |
| Hardness (Shore A Duro.) | 70–74 | 63–69 | 66–71 | 81–86 | 66–71 | 55–58 | 52–55 |
| Sweat-out | trace | mod. | mod. | much | much+ | slight | much |

[1] Santocure, trade name for benzothiazyl disulphide-cyclohexylamine.

While the above recipes depict soft, semi-soft and semi-hard compounds, it is also possible to procure compounds possessed of the hardness of so-called ebonite. These compounds can be produced either through the exclusive use of a curing agent such as No. 17810 or more advantageously by including small quantities of sulphur (2.0 to 6.0 parts) in the formulations recommended for semi-hard compositions. The effect of even small quantities of sulphur is to markedly enhance the rigidity of the vulcanizates. The use of larger quantities of sulphur is not recommended as it unduly embrittles the product. The following formulations are representative:

TABLE XVII

| | Semi-Hard | | Hard | |
|---|---|---|---|---|
| Example | 47p | 47q | 47r | 47s |
| Butadiene-acrylonitrile copolymer rubber | 100.00 | 100.00 | 100.00 | 100.00 |
| Curing agent No. 17,810 | 50.00 | 50.00 | 50.00 | 50.00 |
| Zinc oxide | 40.00 | 40.00 | 40.00 | 40.00 |
| Magnesia (Ex. 1. Calc.) | 26.00 | 26.00 | 26.00 | 26.00 |
| Aluminum tristearate | 13.00 | 13.00 | 13.00 | 13.00 |
| Iron oxide, red | 13.00 | 13.00 | 13.00 | 13.00 |
| Santocure [1] | 2.00 | 2.00 | 2.00 | 2.00 |
| Wax blend | 0.70 | 0.70 | 0.70 | 0.70 |
| Hard reinforcing carbonblack | | 40.00 | | 40.00 |
| Hydrated alumina C-730 | 20.00 | | 20.00 | |
| Titanium dioxide | 53.00 | | 53.00 | |
| Sulphur | | | 3.50 | 3.50 |
| Total | 317.70 | 284.70 | 321.20 | 288.20 |

[1] Santocure, trade name for benzothiazyl disulphide-cyclohexylamine.

To cure the above compounds it is necessary to employ an adequate counter-pressure to prevent blistering and porosity. This operation is advantageously carried out by curing in a press. A cure of from 45 to 60 minutes at a temperature of from 280° F. to 300° F. is satisfactory in the instance of slabs ⅛" thick. The applicants have discovered that one may subject the compounds to a preliminary cure either by heating the same to a temperature of about 300° F. in an oven or by heating the same to between 275° F. and 300° F. in a press for a short period of time and then releasing the pressure. A porous, spongy, more or less thermoplastic material results. This, upon cooling (low temperatures are desirable), can readily be ground or chopped up into small fragments simulating phenolic molding powders. The pre-cured material may be press cured at temperatures of approximately 300° F. in relatively short periods of time. The feasibility of in this way procuring speedy cures along with the consideration that the butadiene-acrylonitrile copolymer rubber content of the ultimate compositions can be reduced to about 25% or so opens up interesting industrial possibilities.

It is far beyond the scope of the present specification to enter into any comprehensive treatment of the various problems that can profitably be attacked through the use of the potentially reactive compositions as herein described. Although the majority of the examples thus far cited have reference to compositions of commercial utility, the applicants wish to point out that the use of the potentially reactive compositions of the present invention are also highly useful from a purely academic standpoint in that they permit one to procure much valuable information in reference to such phenomena as:—relaxation; hysteresis; time influence; thixotropy; yield value; thermo recovery; "lockerstellen"; elastic and plastic deformations; hetero-polar and homo-polar ionic bonds; swelling (intermicellar, intra-micellar, permutoid); internal structure of matter in relation to its elastic and plastic behavior, cohesives and repulsive forces, components of primary and secondary bonds, etc.

Typical of the outstanding and phenomenal results that may be procured through the compositions of the present invention, we may cite metal to metal cements made through the use of curing agents such as No. 17810 and butadiene-acrylonitrile copolymer rubber. Through the use of such cement it is possible to bond various metals to themselves or to one another and secure tensile and shear strengths that are far beyond any that have hithertofore been obtainable. It is thus possible for the first time to realize tensile and shear strengths in the order of from 5000 to 8000 p. s. i. Even glass can be adhered to metal with tensile strength of in the order of 7000 p. s. i. The following cement recipe is typical.

*Compound No. 28523-A*

|   | Parts |
|---|---|
| Butadiene-acrylonitrile copolymer rubber | 100 |
| Magnesia (light calcined) | 20 |
| Zinc oxide | 30 |
| Iron oxide, red | 10 |

| | Parts |
|---|---|
| Compound No. 19230 | 13.5 |
| Compound No. 22715 | 1.94 |

The preferred mixing procedure is to mix the above ingredients excluding the compound No. 22715 upon differential rolls maintained at about room temperature. After the above ingredients have been thoroughly mixed it is desirable to allow the compound a day or so to mellow. Compound No. 22715 may then be incorporated, the volatile solvents contained therein gradually evaporating on the rolls. Compound No. 19230 has the following composition: titanium dioxide, 5 parts; asbestos flour, 3 parts; phenolformaldehyde resin, Novolak type, 2 parts; phthalic anhydride, 1 part; polyvinyl chloride, powdered, 1 part; phenylbetanaphthylamine, 0.5 part; polymerized trimethyldihydro quinoline, 0.5 part; copper oxide, black, 0.5 part. Compound No. 22715 has the following composition: curing agent No. 17724, 11.11 ounces; chloroanacardic material, 2.22 ounces, triethyl citrate, 2.22 ounces; monochlorbenzene, quantity sufficient to bring the volume up to one litre.

Synthetic rubber compound No. 28523–A, as prepared per the above recipe is processed into the form of a dispersion by dissolving 1.81 parts of the same in a solvent mixture comprising 15 parts of ethylene dichloride and 3.5 parts of monochlorbenzene. Among other solvents or solvent mixtures that may be used for this purpose, mention may be made of chloroform; chlorotoluene; mixed dichloropentanes; nitromethane, nitroethane; 1-nitropropane and 2-nitropropane. Where desired, various other materials may be used as partial solvents including acetone, methyl ethyl ketone, methyl isobutyl ketone, trichloroethylene, beta-tri-chloro-ethane, 1,2,3-tri-chlorobutane, ethyl acetate, butyl acetate; dioxane, etc. Materials such as benzene, toluene, styrene and other highly aromatic solvents are useful as diluents. For the best results the dispersion is allowed to stand a few days and then decanted so that the heavier materials settle out. It will be noted that 20.31 parts of the above dispersions contain exactly one part by weight of the butadiene-acrylonitrile copolymer rubber.

A cement may be prepared out of the above dispersions by adding 1.20 parts of compound No. 22712 to 20.31 parts of the aforesaid dispersions. Compound No. 22712 is prepared by mixing curing agent No. 17724 (22.2 parts) with ethylene dichloride (9.0 parts) and monochlorbenzene (2.1 parts). The resultant cement may for convenience be referred to as compound No. 32517–B. It will be noted that in preparing the cement the total weight of so-called curing agent is actually somewhat greater than the weight of rubber polymer. The above cement is specifically intended for heat bonding a wide variety of metals, vitreous substances such as asbestos and rockwool body and many types of organic polymers including rubber; thermoset resin; thermoplastics; wood; glass; porcelain; polyacrylate; polymethacrylate; vinylidene chloride plastics; synthetic rubbers of the butadiene-acrylonitrile copolymer type; etc. When it is desired to join together metals it is recommended that the metals be first primed with a solution consisting of 10 ounces of curing agent No. 17792 dissolved in enough toluene to bring the volume up to one litre. This primer may be applied by brushing, dipping or spraying. The prime coat should be permitted to air-dry for between five and thirty minutes at ordinary temperatures under a relative humidity of below 60%. After the primer has air-dried the above described cement may be applied. After application the faying surfaces coated with the cement should be permitted to air-dry for a period of between 45 and 60 minutes under a humidity of not above 60%. After air-drying the coated surfaces may be brought into contact and the units assembled. Pressure should then be applied (10 to 200 p. s. i. are indicated). To achieve the full and proper cure it is necessary to use temperatures of between 290° F. and 340° F. A cure between 60 minutes and 90 minutes yields the optimum strength.

It becomes clear from a study of the foregoing disclosures that the potentially reactive compositions of the present invention as well as their cured counterparts are exceedingly diverse as regards the components that comprise the same. Nevertheless the essential components are strictly limited as regards their classification and fitness for use in the present invention. In each and every instance one of the essential components is selected from the class consisting of the saturated halogenation products of the aldehydes of the mono hetero atomic five membered rings and their reactive derivatives. The term "halogenation" as used throughout these specifications has reference to the introduction of the elements chlorine, fluorine, bromine and iodine. In preparing the halogenation product one may use two or more different halogen elements. These various aspects have been depicted in the foregoing examples.

The term "mono-hetero atomic five membered rings" has particular reference to the furane, thiophen and pyrrole rings. The curing agents around which the present invention centers are all derived from the hetero atomic five membered rings. Various of the above examples are drawn to each of the aforementioned rings. The aldehydes of the various homologues of the above rings are equally useful for the purposes of the present invention and this aspect has been illustrated by various of the above examples.

It is anticipated that five membered mono hetero atomic rings wherein the hetero atom is an element other than oxygen, sulphur or nitrogen would be equally useful in the present invention, e. g., selenophen aldehyde. It may also be anticipated that the aldehydes of heterocyclic rings other than the five membered rings could be utilized for the production of the curing agents resembling those derived from the mono hetero atomic five membered rings, e. g., rings such as those of pyridine or the corresponding sulphur analogue. It may similarly be anticipated that many heterocyclic ring structures containing more than one hetero atom and possessing a system of conjugated double bonds within the ring structure would lend themselves to the production of curing agent of the type herein referred to. This would be particularly true of the dihetero atomic six membered rings. The hetero atoms may or may not be similar. It is also anticipated that some of the condensed rings systems wherein one ring contains at least six atoms, one of which is hetero atomic (e. g., benzopyran, quinolene, etc.), could be used. It is anticipated that the ring condensed with the heterocyclic ring may belong to any of the well-known three, four, five and six membered rings, as well as the condensed rings of the type of naphthalene; anthracene; phenanthrene; xanthene; thianthrene;

acridine; phenazine; phenoxazine; naphthazene; spiropentane; purine; chrysene, pyrene; triphenylene. It is anticipated that the heterocyclic ring may be part of a "spiro" compound.

The present inventors have found that some derivatives of the aldehydes, e. g., furfuracetone and its homologues and analogues, upon halogenation, yield interesting products which, while distinctive in various respects, are usable for the preparation of potentially reactive curable compositions similar to those already described. Further, there are indications that halogenation products of some of the derivatives of the mono hetero atomic five membered rings other than the aldehydes per se when used alone or in conjunction with the aldehydes yield complex products which to a greater or lesser degree partake of the properties with which the already described curing agents are endowed.

The applicants wish to stress that the reactive derivatives of the saturated halogenation products of the aldehydes of the mono hetero atomic five membered rings are just as serviceable and in many instances are to be preferred to the saturated halogenation products per se. This preference for the use of the active derivatives resides in the fact that it enables one to procure products that are possessed of predetermined functional attributes. Thus it is possible to prepare derivatives which are more reactive in their ability to effect cures than the straight halogenation products. Similarly it is possible to prepare derivatives which are milder in their action than the straight halogenation products. Further, it enables the production of curing agents possessed of predetermined solubilities, fusion points, etc., thus permitting one to design curing agents that are preeminently adapted for use in specific applications. These various aspects have been illustrated in the foregoing examples.

The applicants wish to reiterate that the ascertainment of whether or not a derivative of the saturated halogenation products of the mono hetero five membered rings is reactive comprises nothing more than a simple routine test and does not necessitate any extended experimentation. As has already been indicated, such a test may conveniently be conducted by simply adding the derivative in question to a small quantity of a material such as polyethylene polyamine, e. g., tetraethylene pentamine. If upon the addition, and if necessary the aid of a little warmth, a definite reaction occurs, then the derivative is of the reactive type—if no reaction occurs then the derivative may be regarded as non-reactive and as not lending itself for use in the present invention. It is to be noted that the above test is of the same order of simplicity as that of any of the usual tests for the ascertainment of whether or not a given material is acid or alkaline, e. g., a pH meter or by means of a chemical indicator.

From the standpoint of greatest utility the halogenation products of furfural are to be preferred because of the availability of furfural at a low price and in substantially unlimited quantities from products of vegetable origin. The preferred halogen in the production of the halogenation products is chlorine because of its ready availability and low cost as compared to that of the other halogens. This aspect has already been commented upon and is further attested to by the fact that the majority of the foregoing illustrative examples center around the use of chlorinated furfural and its reactive derivatives.

The various curing agents around which the present invention centers may be clearly and precisely defined as the "saturated halogenation products of the aldehydes of the mono hetero atomic five membered rings and their reactive derivatives."

The materials that may be used as co-agents for admixture with the curing agents to produce the potentially reactive and curable compositions of the present invention need possess but a single indispensable functional attribute. That essential requirement pertains to the ability of the material in question to enter into reaction with the afore-described curing agents so as to yield an ultimate cured article, i. e., one which in the process of cure is converted to an infusible, infusible thermorigid and insoluble state. In short, to be usable as a co-agent the material must be susceptible to cure via the afore-described curing agents.

Co-agents may be selected from any one of several classes of materials. As has been indicated and as has been exemplified in various of the scores of illustrative examples, such a co-agent may belong to the class of resinous substances, rubbery substances, or non-resinous and non-rubbery substances which may be considered more or less monomeric in character and which, upon reaction with the curing agent, are transformed into "cured" products. The co-agent may belong to the class of naturally occurring substances, e. g., shellac, the class of synthetic resins, or the class of synthetic rubbers. The co-agent may belong to the class of substances that may be cured or vulcanized via the use of curing agents other than the herein described class of curing agent or it may belong to the class of substances that cannot be cured via the use of any known agent other than the herein described type of curing agent.

The co-agent invariably belongs to the class of organic compounds. The majority of curable materials that lend themselves to the production of potentially reactive compositions of the present invention are polymeric in structure—they may be polymerization polymers, condensation polymers, isopolymers, interpolymers or heteropolymers. However, a wide variety of low molecular weight products, including simple monomeric compounds such as the furfuracetone condensation products already described, lend themselves for use in the preparation of potentially reactive curable compositions. These aspects have been illustrated by various examples.

The material that is to constitute the co-agent for admixture with a curing agent selected from the class consisting of the saturated halogenation products of the aldehydes of the mono hetero atomic five membered rings or their reactive derivatives to produce the potentially reactive compositions of the present invention may be simply and precisely defined as "any organic material susceptible to cure via the saturated halogenation products of the aldehydes of the mono hetero atomic five membered rings and their reactive derivatives."

Upon prolonged standing at ordinary temperatures the potentially reactive compositions of the present invention will generally be transformed into the cured state. Usually the application of heat markedly accelerates the rate of cure so that in most commercial applications heat is desirable.

The potentially reactive compositions of the present invention may be designed to be possessed of predetermined curabilities. Thus it is possible to procure potentially reactive compositions which when fully cured yield products cured to the ultimate degree. On the other hand it is feasible to subject such potentially reactive compositions to partial or limited cures by controlling the conditions of cure as by regulating the time temperature schedule of the cure cycle. Any given curable material may be converted into a curable composition possessed of a predetermined cure limit. This end can be achieved by regulating the type and the quantity of curing agent admixed therewith. In many instances the ultimate degree of cure can be limited and restricted by regulating the number of potentially reactive atomic groups contained in the material to be cured. It is a relatively simple matter to produce cured compositions of predetermined softening points. For many applications it is desirable to retain in a given polymer as many of its original properties as possible and yet at the same time alter some specific physical or chemical attribute, e. g., a variation of the softening point or a decrease in sensitiveness toward specific solvents. Through the teachings of the present invention these objectives are often easily obtained.

The potentially reactive compositions of the present invention can be subjected to conditions so as to secure a partial or preliminary cure so that when the composition is subjected to the final and complete cure in a subsequent step the same can be more readily accomplished, depending upon the degree to which the original cure has been advanced in the present curing step.

The utility of the potentially reactive compositions of the present invention as well as the ultimate cured products derived therefrom is legend. The products of the present invention may enter into virtually all fields in which resins, rubbers, plastics, coating material, impregnating, etc., are now being utilized. Furthermore, the products of the present invention in many instances open up new fields for exploitation. The potentially reactive compositions of the present invention as well as their ultimate cured products are useful in the manufacture or preparation of such varied prodcts as the following:

| | |
|---|---|
| Abrasives | Insulation, heat |
| Adhesives | Insulation, sound |
| Bacteriacides | Lacquers |
| Bonding agents | Leather substitutes |
| Casting compositions | Molding compositions |
| Cements | Paints |
| Coating compositions | Plastics |
| Dispersions | Plywood |
| Enamels | Proofing compositions |
| Frictional elements | Resins |
| Fungicides | Rubber |
| Glues | Softening agents |
| Gums | Stiffening agents |
| Impregnating materials | Synthetic rubbers |
| Inks | Treatment of textile fabrics |
| Insecticides | |
| Insulation, electrical | Varnishes |

The present invention is not drawn to the production of the saturated halogenation products of the aldehydes of the mono hetero atomic five membered rings and their reactive derivatives per se and where the preparation of the same has been described and illustrated by way of example it has been done only in the interests of clarity.

The present invention is not drawn to the production of co-agents, i. e., materials that are susceptible to cure and may be converted to the infusible, infusible thermorigid, and insoluble state via the use of curing agents selected from the class of the saturated halogenation products of the aldehydes of the mono hetero atomic five membered rings and their reactive derivatives and where such co-agents or curable materials have been described or exemplified by way of example, it has been done only in the interests of clarity.

The present invention is to be understood to be specifically drawn and limited to the production of "potentially reactive curable compositions." The term "curable" as used here and in the appended claims is defined as the faculty of being partially or completely convertible to the infusible, infusible thermorigid, and insoluble state.

The present invention is drawn to the production of potentially reactive curable compositions which comprise two essential classes of materials admixed with one another, viz: (1) a material selected from the class consisting of the saturated halogenation products of the aldehydes of the mono hetero atomic five membered rings and their reactive derivatives, said material functioning as curing agent, and (2) a material (co-agent) selected from the class consisting of organic monomeric and polymeric substances which contain covalently bound potentially reactive atomic groups possessing the faculty of entering into a curing reaction with the saturated halogenation products of the aldehydes of the mono hetero atomic five membered rings and their reactive derivatives.

The invention has been described and defined in considerable detail replete with scores of illustrative embodiments, materials, proportions, conditions, and manipulative techniques. However, it is to be understood that the invention is not to be restricted to any of the above illustrative examples and disclosures and that no limitations are to be imported which are not required by the language of the appended claims and the state of the prior art. It is to be further understood that the invention is not dependent upon any explanations or theories which have been set forth as descriptive of the actions involved nor dependent upon the accuracy or soundness of any theoretical statements so advanced.

What we claim as new and desire to secure by Letters Patent of the United States is:

1. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with a polymeric organic compound containing within its structure, attached via covalent bonds, a plurality of functionally reactive atomic groups known to be reactive with said curing agent said reactivity being determined by bringing any compound "$xy$" into contact with said curing agent, where "$x$" denotes a non-reactive residue and "$y$" denotes such groups tested and the presence of "$y$" bringing about a reaction, said reactive atomic groups being present in the polymeric organic compound in the proportion of at least one such group per thousand atoms of the said polymeric organic compound, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

2. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with a resin containing within its structure, attached via covalent bonds, a plurality of functionally reactive atomic groups known to be reactive with said curing agent said reactivity being determined by bringing any compound "$xy$" into contact with said curing agent, where "$x$" denotes a non-reactive residue and "$y$" denotes such groups tested and the presence of "$y$" bringing about a reaction, said reactive atomic groups being present in the resin in the proportion of at least one such group per thousand atoms of the said resin, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

3. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with a cellulose derivative containing within its structure, attached via covalent bonds, a plurality of functionally reactive atomic groups known to be reactive with said curing agent said reactivity being determined by bringing any compound "$xy$" into contact with said curing agent, where "$x$" denotes a non-reactive residue and "$y$" denotes such groups tested and the presence of "$y$" bringing about a reaction, said reactive atomic groups being present in the cellulose derivative in the proportion of at least one such group per thousand atoms of the said cellulose derivative, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

4. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with an elastomer containing within its structure, attached via covalent bonds, a plurality of functionally reactive atomic groups known to be reactive with said curing agent said reactivity being determined by bringing any compound "$xy$" into contact with said curing agent, where "$x$" denotes a non-reactive residue and "$y$" denotes such groups tested and the presence of "$y$" bringing about a reaction, said reactive atomic groups being present in the elastomer in the proportion of at least one such group per thousand atoms of said elastomer, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

5. Potentially reactive curable compositions consisting of a curing agent selected from the class consisting of the substantially fully saturated halogenation addition products of the aldehydes of the mono hetero atomic five membered rings and their partially dehalogenated reactive derivatives, in admixture with a polymeric organic compound containing within its structure, attached via covalent bonds, a plurality of functionally reactive atomic groups known to be reactive with said curing agent said reactivity being determined by bringing any compound "$xy$" into contact with said curing agent, where "x" denotes a non-reactive residue and "y" denotes such groups tested and the presence of "y" bringing about a reaction, said reactive atomic groups being present in the polymeric organic compound in the proportion of at least one such group per thousand atoms of the said polymeric organic compound, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

6. Potentially reactive curable compositions consisting of a curing agent selected from the class consisting of the substantially fully saturated halogenation addition products of the aldehydes of the mono hetero atomic five membered rings and their partially dehalogenated reactive derivatives, in admixture with a resin containing within its structure, attached via covalent bonds, a plurality of functionally reactive atomic groups known to be reactive with said curing agent said reactivity being determined by bringing any compound "xy" into contact with said curing agent, where "x" denotes a non-reactive residue and "y" denotes such groups tested and the presence of "y" bringing about a reaction, said reactive atomic groups being present in the resin in the proportion of at least one such group per thousand atoms of the said resin, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

7. Potentially reactive curable compositions consisting of a curing agent selected from the class consisting of the substantially fully saturated halogenation addition products of the aldehydes of the mono hetero atomic five membered rings and their partially dehalogenated reactive derivatives, in admixture with a cellulose derivative containing within its structure, attached via covalent bonds, a plurality of functionally reactive atomic groups known to be reactive with said curing agent said reactivity being determined by bringing any compound "xy" into contact with said curing agent, where "x" denotes a non-reactive residue and "y" denotes such groups tested and the presence of "y" bringing about a reaction, said reactive atomic groups being present in the cellulose derivative in the proportion of at least one such group per thousand atoms of the said cellulose derivative, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

8. Potentially reactive curable compositions consisting of a curing agent selected from the class consisting of the substantially fully saturated halogenation addition products of the aldehydes of the mono hetero atomic five membered rings and their partially dehalogenated reactive derivatives, in admixture with an elastomer containing within its structure, attached via covalent bonds, a plurality of functionally reactive atomic groups known to be reactive with said curing agent said reactivity being determined by bringing any compound "xy" into contact with said curing agent, where "x" denotes a non-reactive residue and "y" denotes such groups tested and the presence of "y" bringing about a reaction, said reactive atomic groups being present in said elastomer in the proportion of at least one such group per thousand atoms of the said elastomer, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

9. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with a polymeric organic compound containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the aforesaid polymeric organic compound, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

10. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with a resin containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the said resin, said substantially fully saturated halogenation addition products of the aldehydes of the mono hetero atomic five membered rings produced by the method which comprises the steps of diluting one or more of said aledhydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

11. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with a cellulose derivative containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the said cellulose derivative, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

12. The method of producing potentially reactive curable compositions which consists in mixing a curing agent selected from the class consisting of the substantially fully saturated halogenation addition products of the aldehydes of the mono hetero atomic five membered rings and their partially dehalogenated reactive derivatives, with an elastomer containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the said elastomer, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of haogen per molecule of aldehyde that entered into the making of said saturated halogenation addition products.

13. Potentially reactive curable compositions comprising a curing agent selected from the class consisting of the substantially fully saturated halogenation addition products of the aldehydes of the mono hetero atomic five membered rings and their partially dehalogenated reactive derivatives, in admixture with a polymeric organic compound containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the aforesaid polymeric organic compound, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

14. Potentially reactive curable compositions comprising a curing agent selected from the class consisting of the substantially fully saturated halogenation addition products of the aldehydes of the mono hetero atomic five membered rings and their partially dehalogenated reactive derivatives, in admixture with a resin containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the aforesaid resin, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

15. Potentially reactive curable compositions comprising a curing agent selected from the class consisting of the substantially fully saturated halogenation addition products of the aldehydes of the mono hetero atomic five membered rings and their partially dehalogenated reactive derivatives, in admixture with a cellulose derivative containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the cellulose derivative, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

16. Potentially reactive curable compositions comprising a curing agent selected from the class consisting of the substantially fully saturated halogenation addition products of the aldehydes of the mono hetero atomic five membered rings and their partially dehalogenated reactive derivatives, in admixture with an elastomer containing a plurality of atomic groups selected from the class consisting of the reactive hydrogen containing radicals of the polyvalent non-metallic elements of the fifth and sixth groups of the periodic system, said reactive atomic groups being present in the proportion of at least one such group per thousand atoms of the said elastomer, said substantially fully saturated halogenation addition products of the aldehydes of the mono hetero atomic five membered rings produced by the method which comprises the steps of diluting one or more of said aldehydes with a solvent in proportion of at least one mole of said solvent to each mole of said aldehyde, and then rapidly introducing halogen into the solution while maintaining the temperature thereof below the point of spontaneous decomposition until the aldehyde has taken up substantially four atoms of halogen per molecule of aldehyde and the point of substantial saturation has been reached, and the said partially dehalogenated reactive derivatives produced by the method which comprises dehalogenating the said fully saturated halogenated addition products to a point where the average halogen content of the resultant partial dehalogenation product is equal to not less than one atom of halogen per molecule of aldehyde that entered into the making of said saturated halogenation addition products.

EMIL E. NOVOTNY.
GEORGE KARL VOGELSANG.
ERNEST E. NOVOTNY.

(References on following page)

REFERENCES CITED

The following references are of record in the file of this patent:

UNITED STATES PATENTS

| Number | Name | Date |
|---|---|---|
| 1,682,934 | Richardson | Sept. 4, 1928 |
| 2,269,216 | McNally | Jan. 6, 1942 |
| 2,269,217 | McNally | Jan. 6, 1942 |
| 2,288,588 | Rieche | June 30, 1942 |
| 2,345,966 | Fiedler | Apr. 4, 1944 |
| 2,366,049 | Payne | Dec. 26, 1944 |
| 2,423,139 | Delmonte | July 1, 1947 |
| 2,475,801 | Novotny | July 12, 1949 |
| 2,490,462 | Novotny | Dec. 6, 1949 |

OTHER REFERENCES

Gilman: Recueil des Travaux Chimiques des Pays-Bas, vol. 50, pages 833–836 (1931).

Simonis: Berichte der Deutschen Chemische Gesellschaft, vol. 32, pp. 2084–2086 (1899).